US006965938B1

(12) United States Patent
Beasley et al.

(10) Patent No.: US 6,965,938 B1
(45) Date of Patent: Nov. 15, 2005

(54) SYSTEM AND METHOD FOR CLUSTERING SERVERS FOR PERFORMANCE AND LOAD BALANCING

(75) Inventors: Robert C. Beasley, Durham, NC (US); Susan B. Cirulli, Endicott, NY (US); Wendy D. Neuberger, Vestal, NY (US); John J. D'Esposito, Bayside, NJ (US)

(73) Assignee: International Business Machines Corporation, Armonk, NY (US)

( * ) Notice: Subject to any disclaimer, the term of this patent is extended or adjusted under 35 U.S.C. 154(b) by 704 days.

(21) Appl. No.: 09/657,215

(22) Filed: Sep. 7, 2000

(51) Int. Cl.[7] .............................................. G06F 15/16
(52) U.S. Cl. ..................................... 709/229; 709/248
(58) Field of Search ............................... 709/105, 227, 709/202, 250, 201, 205, 248, 229; 235/379; 707/100, 104, 102, 2, 4; 718/101, 105, 106

(56) References Cited

U.S. PATENT DOCUMENTS

| | | | | |
|---|---|---|---|---|
| 5,715,453 | A | 2/1998 | Stewart ....................... 395/615 |
| 5,918,017 | A * | 6/1999 | Attanasio et al. ............ 709/224 |
| 6,104,717 | A * | 8/2000 | Coile et al. .................. 370/401 |
| 6,125,363 | A * | 9/2000 | Buzzeo et al. ............... 707/100 |
| 6,163,805 | A * | 12/2000 | Silva et al. .................. 709/227 |
| 6,219,680 | B1 * | 4/2001 | Bernardo et al. ......... 715/501.1 |
| 6,330,575 | B1 * | 12/2001 | Moore et al. ................ 715/513 |
| 6,381,644 | B2 * | 4/2002 | Munguia et al. ............. 709/225 |
| 6,401,120 | B1 * | 6/2002 | Gamache et al. ............ 709/226 |
| 6,466,949 | B2 * | 10/2002 | Yang et al. .................... 707/10 |
| 6,466,980 | B1 * | 10/2002 | Lumelsky et al. ........... 709/226 |
| 6,516,327 | B1 * | 2/2003 | Zondervan et al. .......... 707/200 |
| 6,523,027 | B1 * | 2/2003 | Underwood .................... 707/4 |
| 6,578,068 | B1 * | 6/2003 | Bowman-Amuah ......... 709/203 |
| 6,594,819 | B1 * | 7/2003 | Ciarlante et al. ............ 717/170 |
| 6,601,084 | B1 * | 7/2003 | Bhaskaran et al. .......... 718/105 |
| 6,606,643 | B1 * | 8/2003 | Emens et al. ................ 709/224 |
| 6,611,822 | B1 * | 8/2003 | Beams et al. .................. 706/11 |
| 6,631,402 | B1 * | 10/2003 | Devine et al. ............... 709/217 |
| 6,687,731 | B1 * | 2/2004 | Kavak .......................... 718/105 |
| 6,725,264 | B1 * | 4/2004 | Christy ........................ 709/225 |
| 6,760,775 | B1 * | 7/2004 | Anerousis et al. ........... 709/238 |
| 6,801,949 | B1 * | 10/2004 | Bruck et al. ................. 709/238 |

OTHER PUBLICATIONS

Berners-Lee et al.; "Uniform Resource Locators (URL)"; Request for Comments (RFC) 1738; Dec. 1994.*
Brown et al.; "Mastering Lotus Notes"; pp. 6-15, 486-493; ISBN 0782113028; 1995.*

(Continued)

*Primary Examiner*—Marc D. Thompson
(74) *Attorney, Agent, or Firm*—William E. Schiesser; Shelley M Beckstrand

(57) ABSTRACT

A hybrid Notes/DB2 environment provides a requisition catalog on the Web. Client browsers are connected to a GWA infrastructure including a first network dispatcher and a virtual cluster of Domino.Go servers. The network dispatcher sprays out browser requests among configured .nsf servers in virtual server cluster. Communications from this virtual server cluster are, in turn, dispatched by a second network dispatcher servers in a Domino cluster. External objects, primarily for a GUI, are served in a .dfs and include graphic files, Java files, HTML images and net.data macros. The catalog is built from supplier provided flat files. A front end is provided for business logic and validation, as also is a relation database backend. HTML forms are populated using relational database agents. A role table is used for controlling access both to Notes code and DB2 data. Large amounts of data are quickly transferred using an intermediate agent and window.

19 Claims, 20 Drawing Sheets

OTHER PUBLICATIONS

Tewari et al.; "High Availability in Clustered Multimedia Servers"; Proceedings of the Twelfth International Conference on Data Engineering; pp 645-654; Feb. 1996.*

Cardellini et al.; "Redirection algorthims for load sharing in distributed Web-server systems"; Proceedings. 19th IEEE International Conference on Distributed Computing Systems; pp. 528-535; May 1999.*

Lotus Development Corp., an IBM Subsidiary. *Lotus Domino: Application Development with Domino Designer, Rel. 5.* USA, privately printed, 1998. i-vii, 425-430.

Lotus Development Corp., an IBM Subsidiary. *Lotus Domino: Domino Enterprise Integration Guide, Rel. 5.* USA, privately printed, 1998. 9-20, 107-122, 444-451.

* cited by examiner

SYSTEM AND METHOD FOR CLUSTERING SERVERS FOR PERFORMANCE AND LOAD BALANCING

CROSS REFERENCES TO RELATED APPLICATIONS

The following U.S. patent applications filed concurrently herewith are assigned to the same assignee hereof and contain subject matter related, in certain respects, to the subject matter of the present application, the teachings of which applications are incorporated herein by this reference:

Ser. No. 09/657,216, entitled "System and Method for Front End Business Logic and Validation";
Ser. No. 09/657,217, entitled "System and Method for Data Transfer With Respect to External Applications";
Ser. No. 09/656,037, entitled "System and Method for Providing a Relational Database Backend";
Ser. No. 09/656,803, entitled "System and Method for Providing a Role Table GUI via Company Group";
Ser. No. 09/656,967, entitled "System and Method for Populating HTML Forms Using Relational Database Agents";
Ser. No. 09/657,196, entitled "System and Method for Catalog Administration Using Supplier Provided Flat Files"; and
Ser. No. 09/657,195, entitled "System and Method for Providing an Application Navigator Client Menu Side Bar".

BACKGROUND OF THE INVENTION

1. Technical Field of the Invention

This invention pertains to a system and method for managing a requisition catalog on the web.

2. Background Art

A requisition catalog for a large enterprise in a web environment must enable very fast access to a very large database from a large number of clients. A large number of clients is required for optimal performance of a catalog system. There is a need to architect such a system so as to be scalable, that is, capable of providing that fast access to an ever increasing number of clients and a growing database or collection of databases.

In a requisition catalog system for a large enterprise in a web environment, there is a requirement for a system and method for insuring that all general ledger accounts associated with commodities are correct, and within this requirement for providing a description from the associated accounting system for use by customer or requester to select the correct general ledger (GL) account when doing financial validation on a requisition.

A requisition catalog for a large enterprise is stored in a very large database. However, a Lotus Notes database has a hard limit of 2 to 4 gigabytes of data. That is, Notes puts its entire database into one big Notes standard format (.nsf) file. Information in such a nsf file is accessed by a system geometrically. As a result, such a system slows down significantly as it accesses larger files. This slow down ramps up rather badly. Consequently, the hard limit is artificially put in because of this ramp up in access time. The typical solution to this problem is to split a very large database into many smaller databases. Lotus Notes has a Lotus connector/Lotus script extensions connector (LCLSX). This allows connection to other databases but these script extensions are not set up to actually be the database. There is a need in the art for a system and method for utilizing Lotus script extensions in combination with a relational database to provide high capacity storage without performance degradation.

In building a requisition catalog for a large enterprise with many suppliers, an automated process is needed to receive a flat file from a supplier for review by a buyer before being externalized for use by requesters. While the buyer must be able to review the contents, he must be restricted from making changes to certain sensitive fields, such as changing a unit price or a unit of measure, both of which could constitute fraud. Consequently, allowing the buyer to edit the flat file can't provide the level of security required. There is a need in the art to provide a buyer a means of auditing catalog content before externalizing it to production for access by requesters.

A requisition catalog for use in a web environment requires a very large database, such as an IBM DB2 database, and the functionality provided by, for example, a Lotus Notes server. However, a Lotus Notes access control list (ACL) can not be used to control access to an IBM DB2 database, and the privileges on a DB2 table can be granted only by the table instance owner. Additionally, since Notes agents which access DB2 are running from a Notes server, the Notes server ID often has full access to all tables, and there is no way to limit that. That is, in a hybrid (Notes/DB2) environment, the user ID which accesses DB2 tables is the ID of the Notes server. Therefore, access by a user to the DB2 tables can't be selectively restricted. There is a need in the art for a system and method which allows certain users access to certain data in certain selected tables. That is, there is needed a system and method for providing very flexible access to DB2 tables without requiring database administrator (DBA) involvement to issue grants against the tables, and bypassing the problem caused by Notes agents all coming from the same user (the Notes server ID).

In a hybrid requisition catalog system for use in a web environment, much of the application data is stored in, for example, IBM DB2 tables. However, a web interface written in Java script and in HTML does not have functionality for connecting to DB2 and reading data from DB2 tables. No function is provided in Java script and in HTML to connect to or access such a database. It is not presently possible to make the connection by connecting to the database and executing SQL queries. Consequently, there is a need in the art for a system and method utilizing an existing infrastructure including Lotus Notes, Domino Go, and DB2 to combine HTML and Java script web presentation with DB2 data.

In a requisition catalog system for use in a web environment by a large enterprise, there must be provide a way to deal with web sites that exist outside of a firewall, or internal applications within the firewall but outside of the requisition catalog (Req/Cat Web or RCW) application. That is, a system and method is required for transferring a large quantity of data back from such a web site or application to the RCW application in a timely manner. One possible way is to send data on the universal resource locator (URL). However, such a URL is limited to 1 K bytes, which is not enough to do the task quickly for the quantities of information required. Information can be put into a frame, and that information can be read, but only if the information is written and read by the same server.

In a preferred system, the RCW application exists in a frame set in a browser. As part of security for such a browser, Netscape and Internet Explorer (IE) establish ownership of the frames: each frame is a window under control of the browser. A user can open up a session in any frame desired. However, if all of the frames are not owned by same session, then these frames not commonly owned cannot see the contents of each other. In Netscape version 4.51 frame ownership was changed to protect against frame spoofing. Frame spoofing is a way other servers can use to trick the owner of a frame into thinking it had created a frame actually created by someone else, enabling access to data not owned. Netscape 4.51 plugs that hole.

Consequently, in the new environment (with spoofing inhibited) a problem is presented: if a RCW application needs to access an outside supplier site for information to get back through one its own the frames, as soon as data is written by that outside supplier site into one of the frames owned by RCW, ownership of the frame is transferred from RCW to the supplier; RCW no longer owns the frame and cannot access the information. A system and method is needed to enable transfer of data from a supplier site to a RCW application which does not entail frame spoofing.

In a web application, such as a requisition catalog system for a large enterprise, a fast browser interface and navigator is needed, including a very fast graphical user interface (GUI).

There is known in the art several Internet applications which provide a strip down, for example, the left hand side of a window that has a menu of items from which a user may select. Such windows also may display a header, including header type items which will expand upon selection into a drop down list. Such windows also may include a footer including leafs which will, upon selection, change what is seen on the right side of the screen. Such applications provide a very nice user interface for documents, with a table of contents (TOC) on the left, and on the right the selected contents.

However, these expandible and collapsible menus are characteristically slow. This slowness is a result of every click sending a request to a remote server, which server responds by sending information back to expand the list at the browser. Every click on the web is slow, involving communications of the request and response over a relatively slow web communication link. There is, therefore, a need in the art to dramatically increase the speed of operation of a graphical user interface at a browser.

It is an object of the invention to provide a scalable database system in a web environment with optimal access performance characteristics for an expanding number of clients and a growing database.

It is an object of the invention to provide a system and method for enabling a requester to select the correct general ledger account when doing financial validation on a requisition.

It is an object of the invention to provide a system and method for utilizing Lotus script extensions in combination with a relational database to provide high capacity storage without performance degradation.

It is an object of the invention to provide a system and method for enabling a buyer a means for editing catalog content before externalizing it to production for access by requesters.

It is an object of the invention to provide a system and method for providing very flexible access to DB2 tables without requiring database administrator (DBA) involvement to issue grants against the tables, and bypassing the problem caused by Notes agents all coming from the same user (the Notes server ID).

It is an object of the invention to provide a system and method utilizing an existing infrastructure including Lotus Notes, Domino Go, and DB2 to combine HTML and Java script web presentation with DB2 data.

It is an object of the invention to provide a system and method for enabling transfer of data from a supplier site to a RCW application which does not entail frame spoofing.

It is an object of the invention to provide a system and method for dramatically increasing the speed of operation of a navigation frame of a GUI.

SUMMARY OF THE INVENTION

A scalable system and method for providing a web processing tool, such as a requisition catalog application, includes first and second clusters of virtual servers. User requests received at a browser are sprayed out by a first network dispatcher to the first cluster, and thence selectively sprayed out by a second network dispatcher to the second cluster. Virtual servers within the second cluster are synchronized. Data requests received by the second cluster are either processed locally or are directed to a relational database server. An application server interacts with the second cluster, the relational database, and back-end servers to synchronize data.

Other features and advantages of this invention will become apparent from the following detailed description of the presently preferred embodiment of the invention, taken in conjunction with the accompanying drawings.

BEST MODE FOR CARRYING OUT THE INVENTION

1. Clustered Servers

In accordance with the preferred embodiment of the invention, a requisition catalog system (RCW, or Req/Cat Web) is provided within a global web architecture (GWA) infrastructure. Such an architecture provides for the large number of clients required to assure good performance. In an exemplary embodiment, the requisition catalog application is deployed within the IBM web domain, which requires the use of GWA for clustering of W3 and www.ibm.com web sites. This architected solution assures a scalable Req/Cat Web application.

Figure 1:
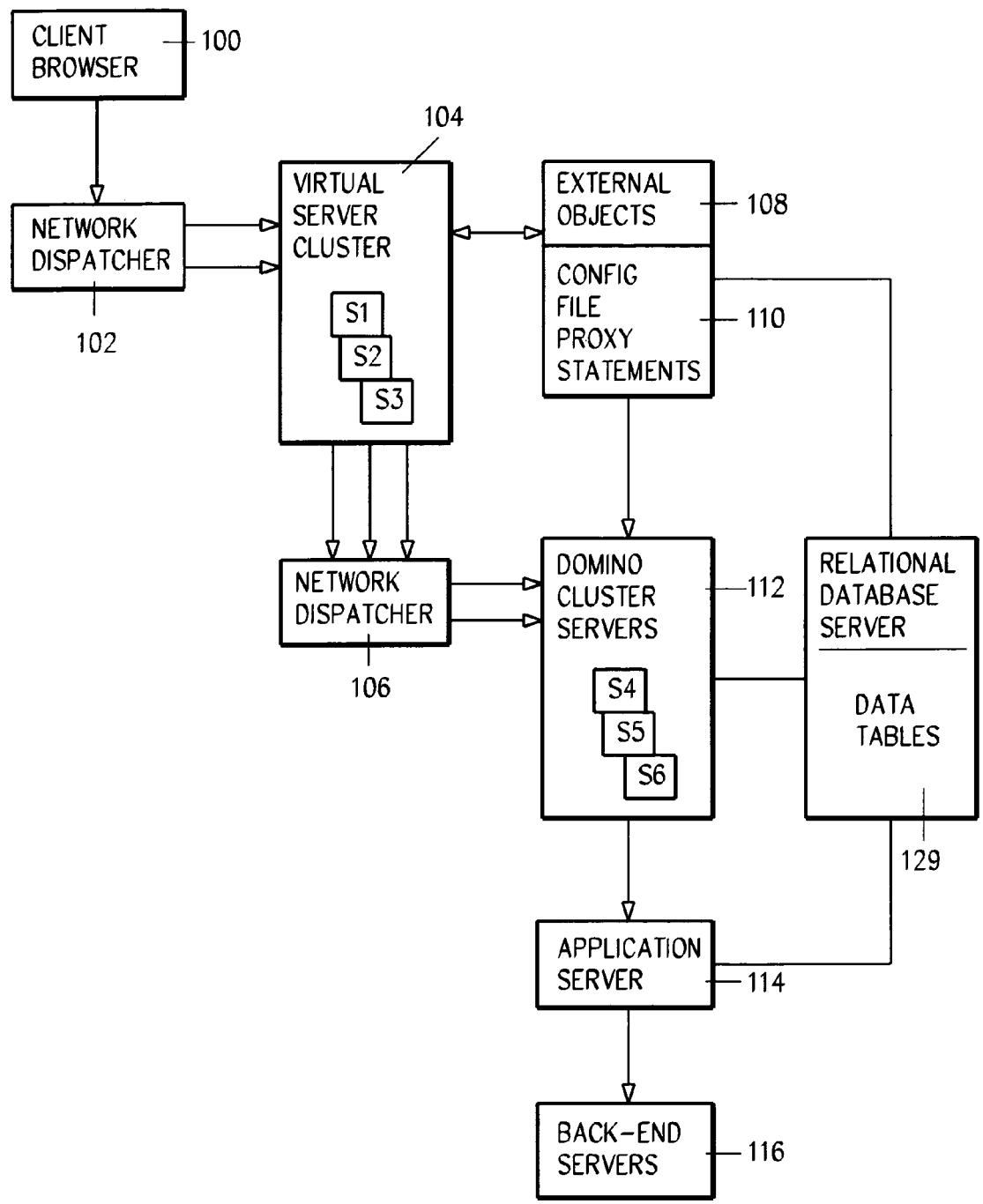
FIG. 1 is a high level system diagram illustrating a clustered configuration of servers for performance and load balancing.

Referring to FIG. 1, client browsers 100 are connected to a GWA infrastructure including network dispatcher 102 and domino.go, a virtual cluster of Domino servers. Network dispatcher 102, sprays out or dispatches requests among configured servers S1, S2, S3 in virtual server cluster 104. Communications from cluster 104 are, in turn, dispatched (also referred to as sprayed out, distributed, proxy passed, or redirected) by network dispatcher 106 among servers S4, S5, and S6 in Domino cluster 112. While three servers are illustrated as configured in each of clusters 104 and 112, each cluster configuration may be scaled to any number of servers. External objects 108, which can be stored on a dynamic file system (DFS), include graphic files, Java files, HTML images, net.data macros, and other files external to Domino, and in particular include configuration file proxy statements 110. In this instance, external objects 108 are stored on a DFS and exist only once, so it is not necessary to replicate all of the external objects to each of the servers S4–S6. External objects 108, served in a DFS are graphic files, Java files, anything that would live outside of the server files (also referred to .nsf files) S4–S6, including HTML images and net.data macros. These are part of the code implementing the Req/Cat Web application of the preferred embodiment of the invention, but are not part of Domino code, and are primarily for the GUI. By storing them outside of cluster servers 112, performance is improved.

In order to avoid potential bottlenecks on the clustered Domino servers 112 and in order to store a larger amount of data than is quickly searchable in Domino, a relational database 129, such as the IBM DB2 database, is used to store configuration data. Data is written by the clustered servers 112 by the end user, or by batched programs stored on application server 114 that are receiving data from back-end systems 116.

Figure 2:
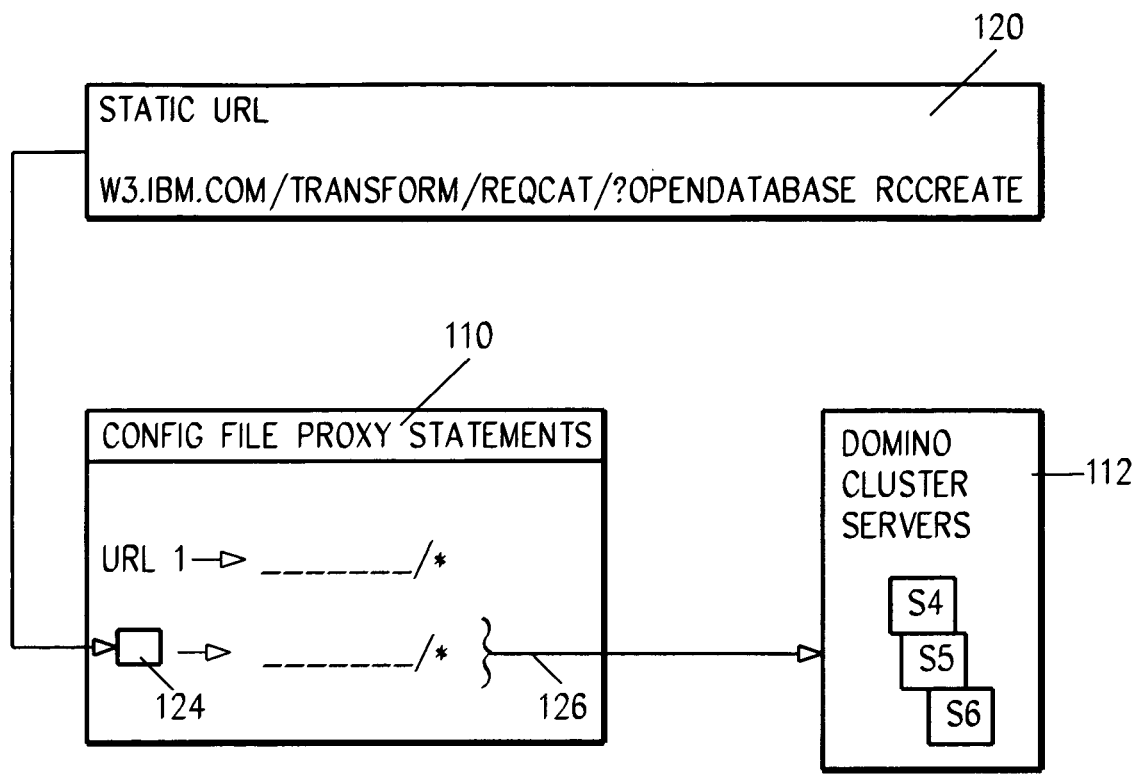
FIG. 2 is a diagram illustrating proxying out of URLs to clustered servers.

Referring to FIG. 2, in accordance with the invention, a proxy pass is used with both domino.go cluster 104 and Domino cluster 112. In accordance with a proxy pass, when a URL 120 is passed to network dispatcher (ND) 106, the ND processes that out and sprays it to any one of the configured servers. Spray means to distribute or map a URL 120 to any one of these configured servers S1–S3, S4–S6, which is the effect of mapping, as is represented by line 126, URL 120 to any of S4, S5, S6 in cluster 112. Examples of URLs include <w3.ibm.com/*>, <wwww.ibm.com/*>, and_<w3.ibm.com/transform/reqcat/intralib.nsf>.

In accordance with the invention, a unique architecture for a requisition catalog system includes a hybrid application using external objects 108 in a dynamic file system off of the domino.go cluster 104 that works with network dispatcher 106 and the proxy pass capability 110 to redirect traffic to the Domino cluster 112.

These servers S4–S6 are mirror images: each has same .nsf files. Periodically, these servers replicate back and forth so that information is contained in all of them. Data is kept consistent.

In operation, when a client comes in through browser 100, his request can be directed to any domino.go server S1–S3 that determines the mapping of the URL request and what type of function is needed (displaying of images or code execution on S1–S3, or connecting to an .nsf server S4–S6 to display user data).

.nsf servers S4–S6 then feed requests to the application server 114, which in this embodiment is a backend Req/Cat Web (RCW) server to which all data gets replicated and where the bridges and agents run. Data gets replicated out to other back-end servers (DB2, MVS, SAP) 116 as needed. A bridge is an application that transfers data from one server to another server. An agent is an application that runs scheduled or by request to do some processing of data.

In an exemplary embodiment, Domino.go, or virtual server cluster, 104 is part of the GWA infrastructure. Any w3.ibm.com or www.ibm.com must go through a domino.go cluster 104. In accordance with the present invention a proxy out to the Domino cluster 112 is also provided. The purpose of this is to improve scalability and performance. Proxy statements 110 are used to ensure that the proper pieces of the application are invoked as appropriate, depending upon what the end user is doing. These statements are a mapping through a configuration file of URL 120 to any clustered server 112.

Figure 3:
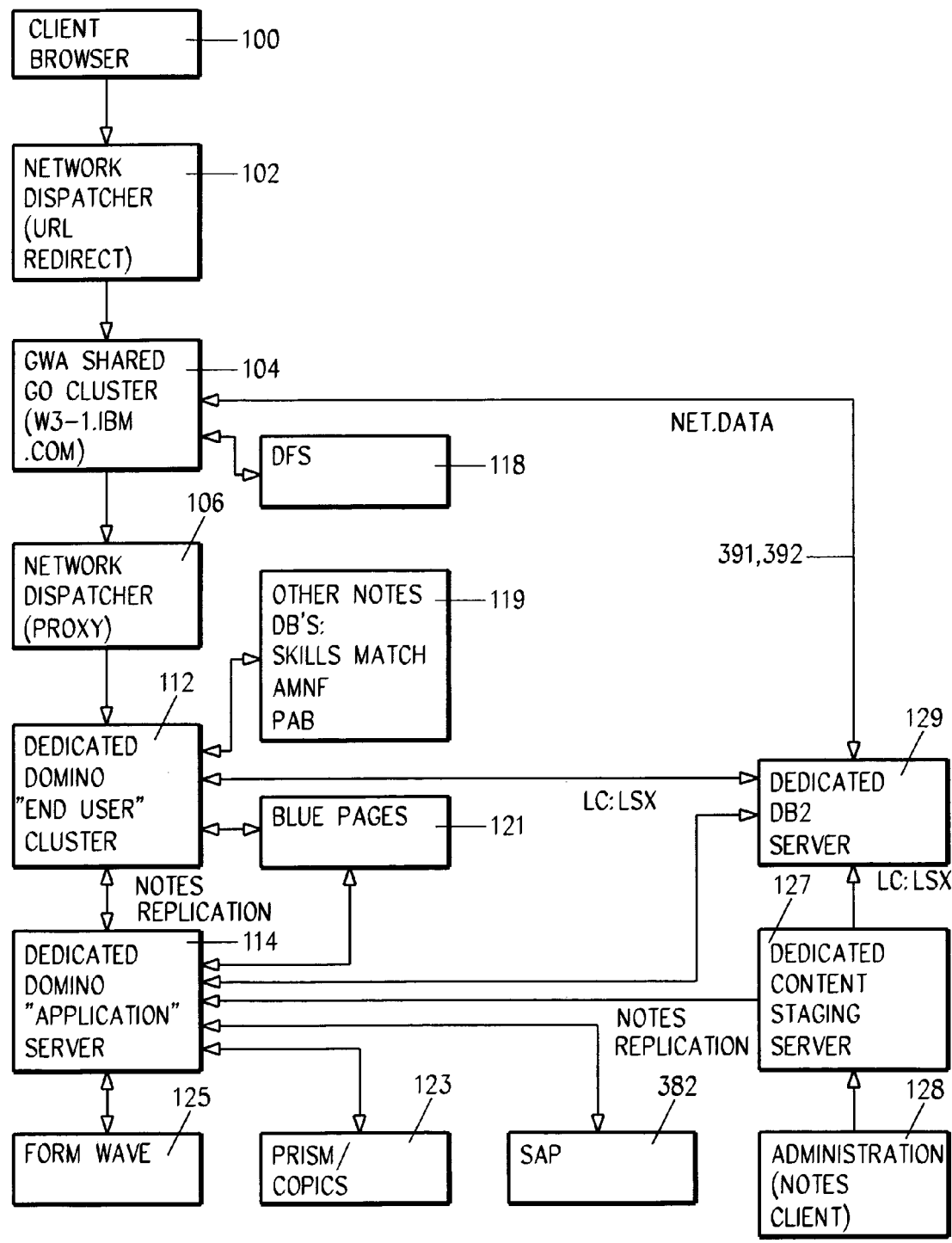
FIG. 3 is a system diagram illustrating a specific example of a clustered configuration of servers.

Referring to FIG. 3, a specific exemplary embodiment of the invention includes client browser 100 connected to network dispatcher (URL redirect) 102, which is connected to GWA shared GO cluster (W3-1.IBM.COM) 104. Cluster 104 is connected to external objects including OBI 117 and DFS 118, to dedicated DB2 server 129, and to network dispatcher (proxy) 106. Dispatcher 106 is connected to dedicated Domino "end user" cluster 112. Cluster 112 is connected to Blue Pages database 121 (an internal personnel database), dedicated DB2 server 129, dedicated Domino "application" server 114, and other Notes databases 119, including Skills Matching (an application for contracting technical services), AMNF (an application for identifying nonmanager requisition approvers), and public address book (PAB, for user login and authentication). Application server 114 is connected to FormWave 125 (an application that does approval form routing), PRISM/Copics 123 (which are requisition feeder systems on MVS and AS/400), SAP 382 (an ERP, or enterprise resource planning system, including an accounting application having an accounts payable function), dedicated content staging server 127 where an administration Notes client 128 runs, and dedicated DB2 server 129. The content staging server is used to update both nsf and DB2 configuration data, and is also connected to server 129.

The architecture of FIG. 3 presents a complex, scalable global procurement application (referred to as Req/Cat Web) implemented within Global Web Architecture (GWA). Req/Cat Web allows customers to generate on-line, general procurement requisitions. Customers interfacing client browser 100 can search through vendor catalogs to select items and fill in order information. Submitted requisitions are routed through an approval process using FormWave 125. Requisitions that have been approved are sent to a back-end system (SAP) 382, where a purchase order is cut and billing occurs. Customers can monitor their requisition status, as the back end sends status updates to the application 114.

Technologies utilized in building Req/Cat Web include the following: Domino.Go 104 provides a proxy passing function and caching facility. Lotus Notes/Domino is used for its security and workflow capabilities. DB2 provides rich relational database functions and data management. Net-.Data is used for its catalog searching functionality. Javascript is used for GUI presentation and data verification. Req/Cat Web application code sits on DFS 118, on the Domino cluster servers 112, and on Domino application server 114.

Architectural elements include load balancing, file storage, end-user front end (which reside in the Domino cluster servers 112), back-end processing, external dependencies, and use of frames. For load balancing, Req/Cat Web uses the GWA proxy pass architecture previously described with respect to FIG. 2.

Network dispatchers 102, 106 are used between the client 100 and the Domino.Go cluster 104 and also between the Domino.Go cluster 104 and Domino cluster 112 to automatically balance the load of http requests among servers S1–S3 and S4–S6. Configuration file (httpd.conf) 110 contains the proxy statements that are used for redirections. When a client 100 enters the url (w3.ibm.com/transform/reqcat) and Network dispatcher 106 redirects the client to the appropriate server 112, the redirection is transparent to the client.

Workload is split between Domino.Go 104 and Domino 112 to improve performance.

File storage is provided by dynamic file system (.dfs, or DFS) 118, which contains javascript files (.js), html, images, and net.data macros. Domino servers 114 contain navigation, configuration, create requisition, open requisition, requisition invoice paid, requisition archive, cost center, confirmations, and help databases. DB2 server 129 contains tables including: confirmations, user profiles, zip codes, accounting data, commodity configuration data, buyer information, routing, and catalogs.

An end-user front end for Req/Cat Web uses Domino authentication to permit login to the application. The client uses his Lotus Notes ID and pre-set http password to "authenticate". When a client logs in at browser 100, the Domino servers 112 (S4–S6) are configured to check the name and password in public address book 119, which is a designated server within GNA. In a further exemplary embodiment, secure login function may be provided through the implementation of digital certificates. Data is retrieved from DB2 129 using LC:LSX calls via Notes agents, or Net.Data. Net.Data is used for a catalog searching and drill-down function. Java APIs are used for information retrieval from BluePages 121.

As much processing as possible is performed asynchronously on the back-end, application server 114. Bridge jobs are scheduled on two levels: system level (CRON) and notes level (Agents). Agents run periodically, say hourly, to process requisitions and send them to SAP 382. Other agents are scheduled off-peak, where ever possible.

External dependencies include FormWave for form approval routing, BluePages for personal data for user profile creation and approver changes, interfaces to Open Buying on the Internet (OBI) server and skill matching applications, and SAP for receiving requisitions for purchase order (PO) creation and processing. Information returned by SAP to Req/Cat Web includes requisition status, PO/RFS status, PO history, negative confirmations, currency codes, and configuration information.

By using frames, a large majority of preprocessing can be performed dynamically, on the client, reducing the number of trips back and forth to the server. This is a tremendous boost to performance. The web screen described hereafter is not the result of a Notes form, but rather of a dynamically generated HTML/javascript code produced by a displayReqHeader( ) function. This function dynamically writes html and javascript code into the content frame of the application. The javascript function is coded in a displayreq.js file stored on the filesystem and loaded into a jsCode frame by a source (<script src="./js/displayreq.js">) command in a jscode.html file at the time when the initial frameset is loading. A displayReqHeader( ) function is called from several places in the application to redisplay the requisition information in the content frame. This screen is called any time a WebReq Lotus Notes form is opened by an OpenForm command for a new requisition, or by an OpenDocument command when an existing document is opened. OpenForm occurs when the displayReqHeader( ) javascript function is called as the last part of an OnLoad event coded in the HTML-Attributes property of the WebReq form. Any time an existing document is opened that was saved with Form-WebReq, the OnLoad event causes the displayReqHeader( ) javascript to be run to OpenDocument. Any time a content frame has been loaded with some other page during the processing of a requisition, and the user performs an action to return to the requisition in process, the displyReqHeader( ) javascript function is called directly. This form reads the information stored in a reqData frame and dynamically fills the content frame with this screen.

Figure 4:
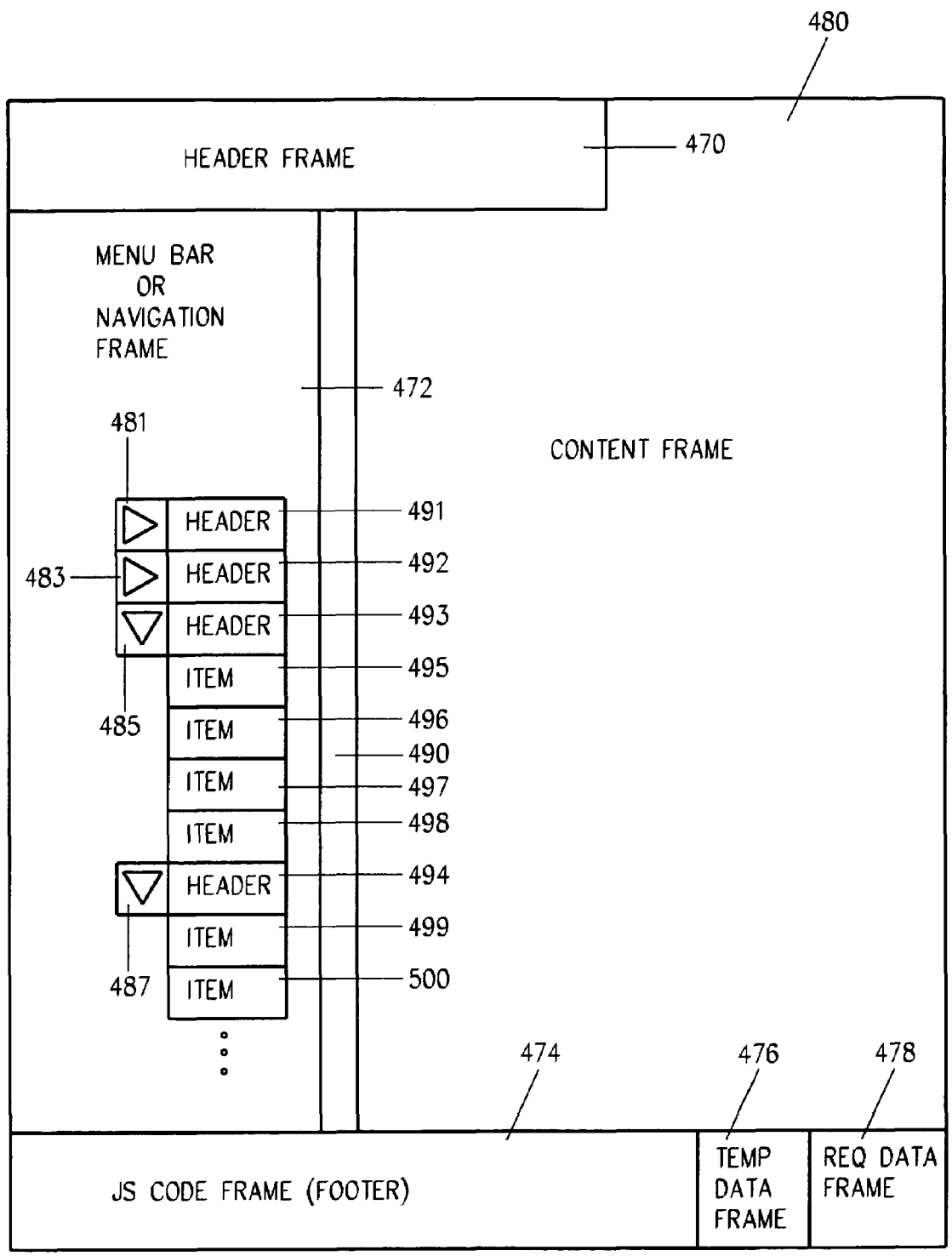
FIG. 4 is a diagram illustrating the frames comprising a typical screen display.
Figure 5:
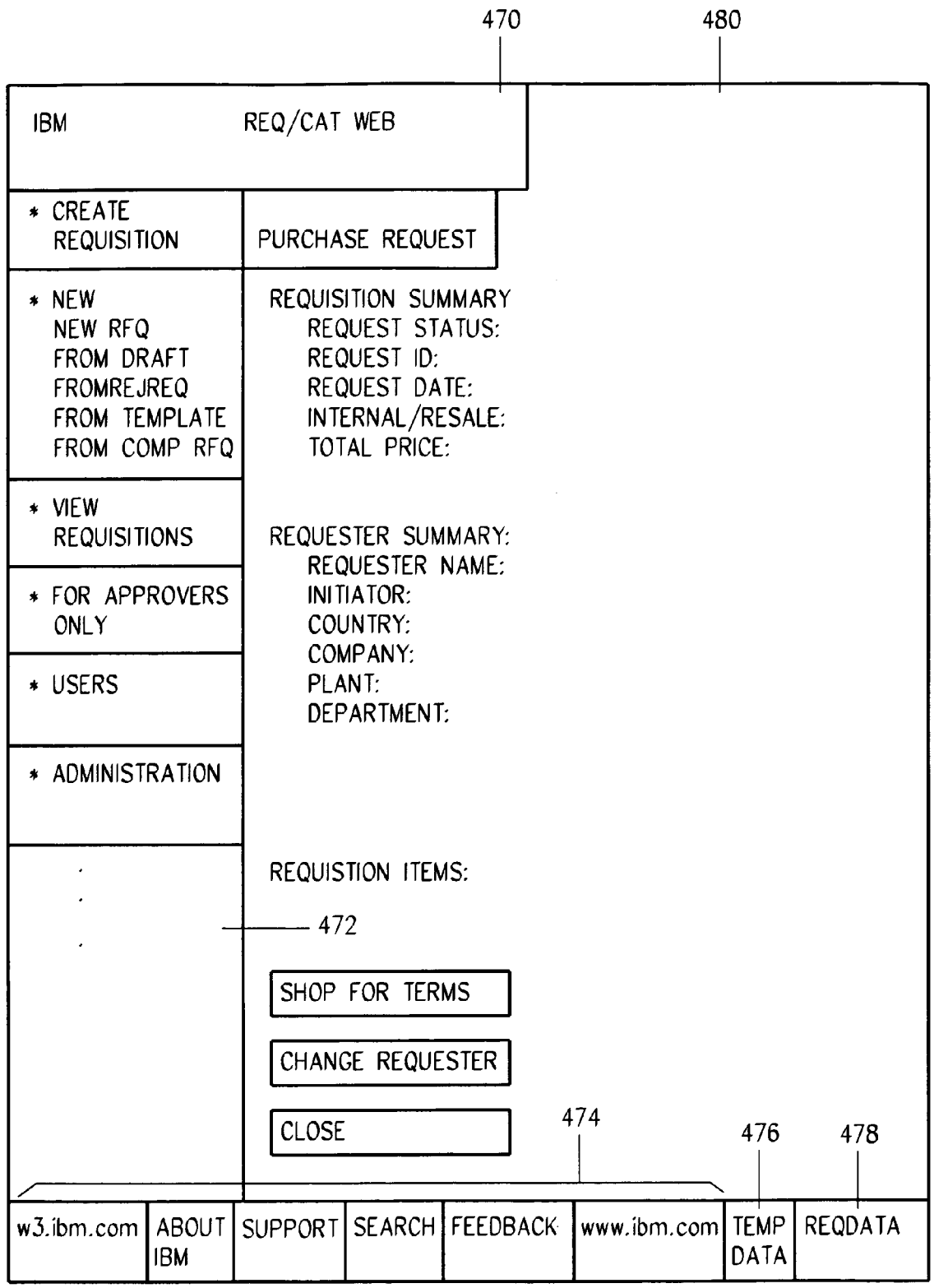
FIG. 5 is a diagram illustrating a specific instance of the display of FIG. 4.

Referring to FIGS. 4 and 5, as will be more fully described hereafter, a screen display includes header frame 470, navigation frame 472, footer frame 474, temporary data frame 476, request data frame 478, and content frame 480. The tempData frame 476 is used as a temporary holder for information, and to direct calls dynamically, while keeping the current data in the screen, and making the return data available to the application.

Table 1 shows, for the exemplary embodiment of FIG. 3, the software loaded on each of the servers used for the Req/Cat Web application.

TABLE 1

SERVERS AND SOFTWARE

| | Server Description | Software |
|---|---|---|
| 1 | | |
| 2 | Domino.Go Servers S1–S3 | AIX 4.3.2 |
| 3 | | Domino Go 4.6.2.6 with Denial |
| 4 | | of Service Fix |
| 5 | | Net.Data 2.0.8 |
| 6 | | DB2 CAE 5.2 |
| 7 | | DFS Client |
| 8 | | Java Runtime 1.1.6 |
| 9 | Domino End-User Servers | AIX 4.3.2 |
| 10 | S4–S6 | Domino 4.6.4 |
| 11 | | DB2 CAE 5.2 |
| 12 | | Java Runtime 1.1.6 |
| 13 | Domino Application Server 114 | AIX 4.3.2 |
| 14 | | Domino Go 4.6.2.6 with Denial |
| 15 | | of Service Fix |
| 16 | | DB2 CAE 5.2 |
| 17 | | Java Runtime 1.1.6 |
| 18 | | Mercator 1.4.2 with Svc Pack 3 |
| 19 | | Hith Test API |

TABLE 1-continued

SERVERS AND SOFTWARE

| 1 | Server Description | Software |
|---|---|---|
| 20 | | Lotus VIM |
| 21 | | C++ 3.6.4 |
| 22 | UDB Server 129 | AIX 4.3.2 |
| 23 | | UDB 5.2 |
| 24 | | Java Runtime 1.1.6 |
| 25 | Content Staging Server 127 | AIX 4.3.2 |
| 26 | | Domino 4.6.4 |
| 27 | | DB2 CAE 5.2 |
| 28 | | Java Runtime 1.1.6 |

2. Front End

The Req/Cat Web front end provides several validation routines, including ZIP code validation, catalog search criteria, and chart of account validation. In the architecture of FIGS. 1 and 3, various programs, including ZIP code validation, catalog search and chart of account validation routines reside in application server 114, and the data tables, including the chart of accounts, reside in the relational database 129.

ZIP code validation is provided to assure that the tax department is provided the information needed implement the correct tax rules on purchase orders in SAP 382.

Chart of accounts validation includes the mapping of commodity codes to account codes. This is done to insure that all general ledger accounts associated with commodities are correct, and within this to insure that a description from SAP 382 is available for use by a customer to select correct general ledger (GL) account when doing financial validation on a requisition.

Figure 6:
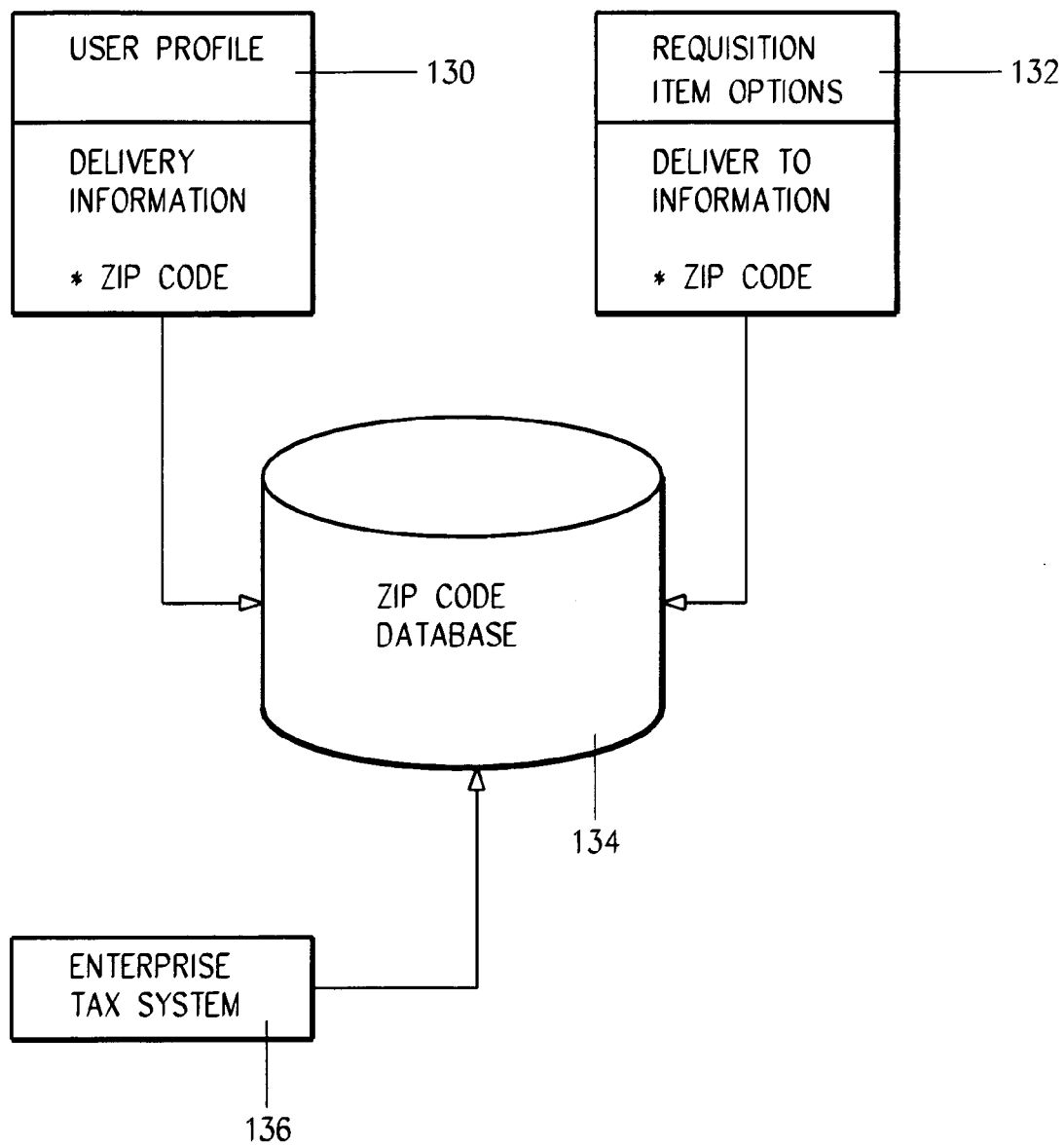
FIG. 6 is a diagram illustrating ZIP code validation.

Referring to FIG. 6, for ZIP code validation, when a purchaser access RCW, a user profile 130 is accessed. Profile 130 includes many defaults, one of which is delivery information (defaulted to all line items of requisition). One of the fields in profile 130 is ZIP code. When the purchaser enters his ZIP code, RCW searches ZIP code database 134, a database for ZIP codes which is fed periodically, say nightly, from the enterprise tax system 136. This same validation routine continues by creating a requisition 132 with item options, including deliver to information with a zip code field. The requester can change the deliver to information, 132, but any time it is changed, the ZIP code is checked against ZIP code database 134. Whereas previously, customer input of ZIP code was accepted without checking. By this invention, ZIP code validation is performed at the front end by a java or SQL program call to db2 database 134. Responsive to entry of ZIP code on a requisition or to the changing of delivery information which includes ZIP code on a requisition line item, the ZIP code is validated against a database of valid ZIP codes. In an alternative embodiment, the ZIP code database is refreshed from a trusted source, and the entered or changed ZIP code is checked for valid match with respect to state and city.

A create requisition request goes to catalog search, which used to search by part number or description. Previously, this was a very limited search to just the catalogs. A search argument of % pen % was not a very crisp search for the customer. In order to improve the catalog search, in accordance with the present invention, searches may be conducted against a longer description and files up to 255 characters. Screen down searches are provided for subcommodity. Wild card searches used to require %, but now assumes a wild card search in all cases. Searches are also provided against subcommodity. As a result, catalog searches now reference short description, long description, and catalog sub-commodity. A database catalog includes part number, short description, long description, oem part number, commodity code. Newly added is subcommodity.

Figure 7:
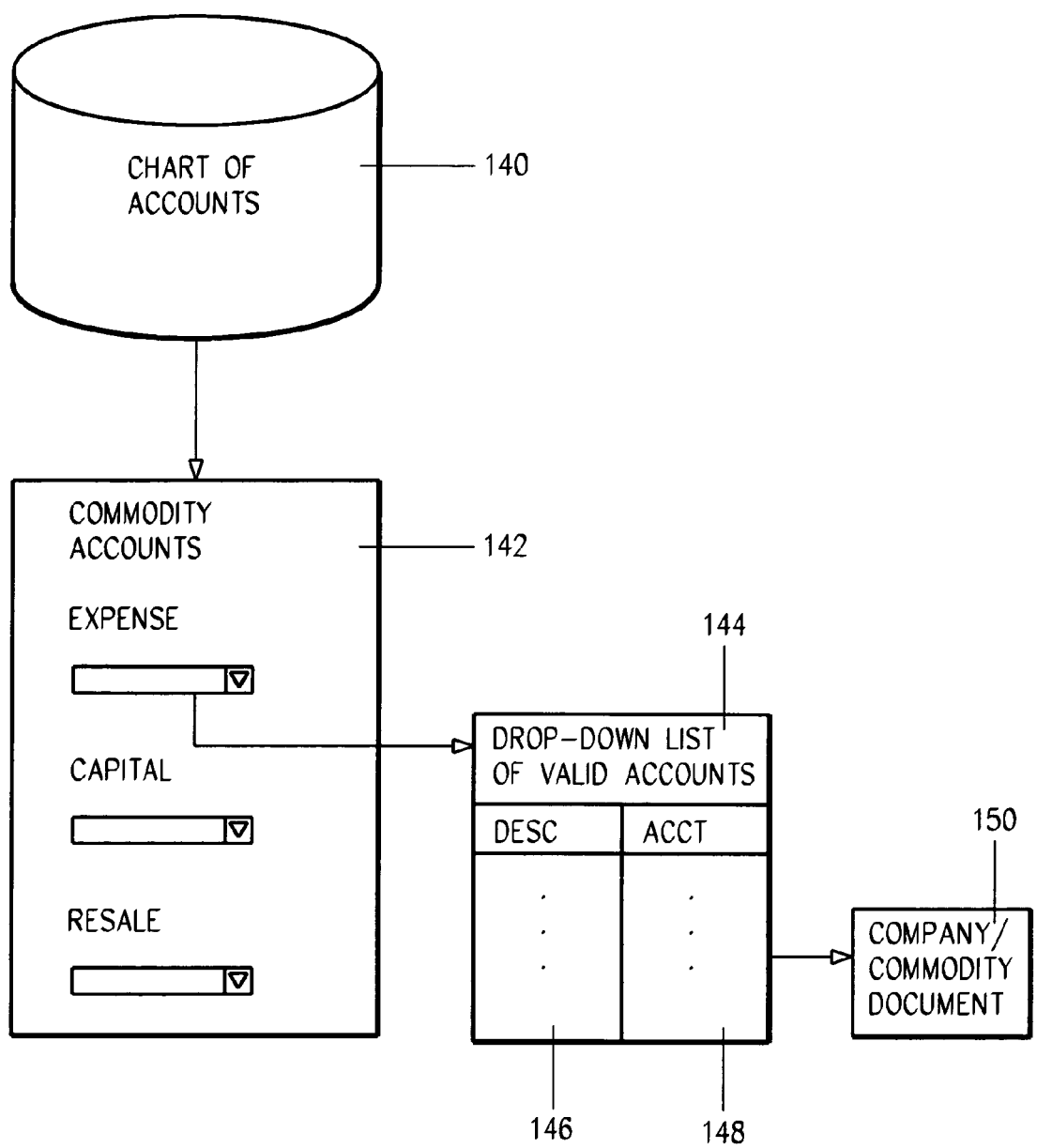
FIG. 7 is a diagram illustrating requisition catalog searching.
Figure 9:
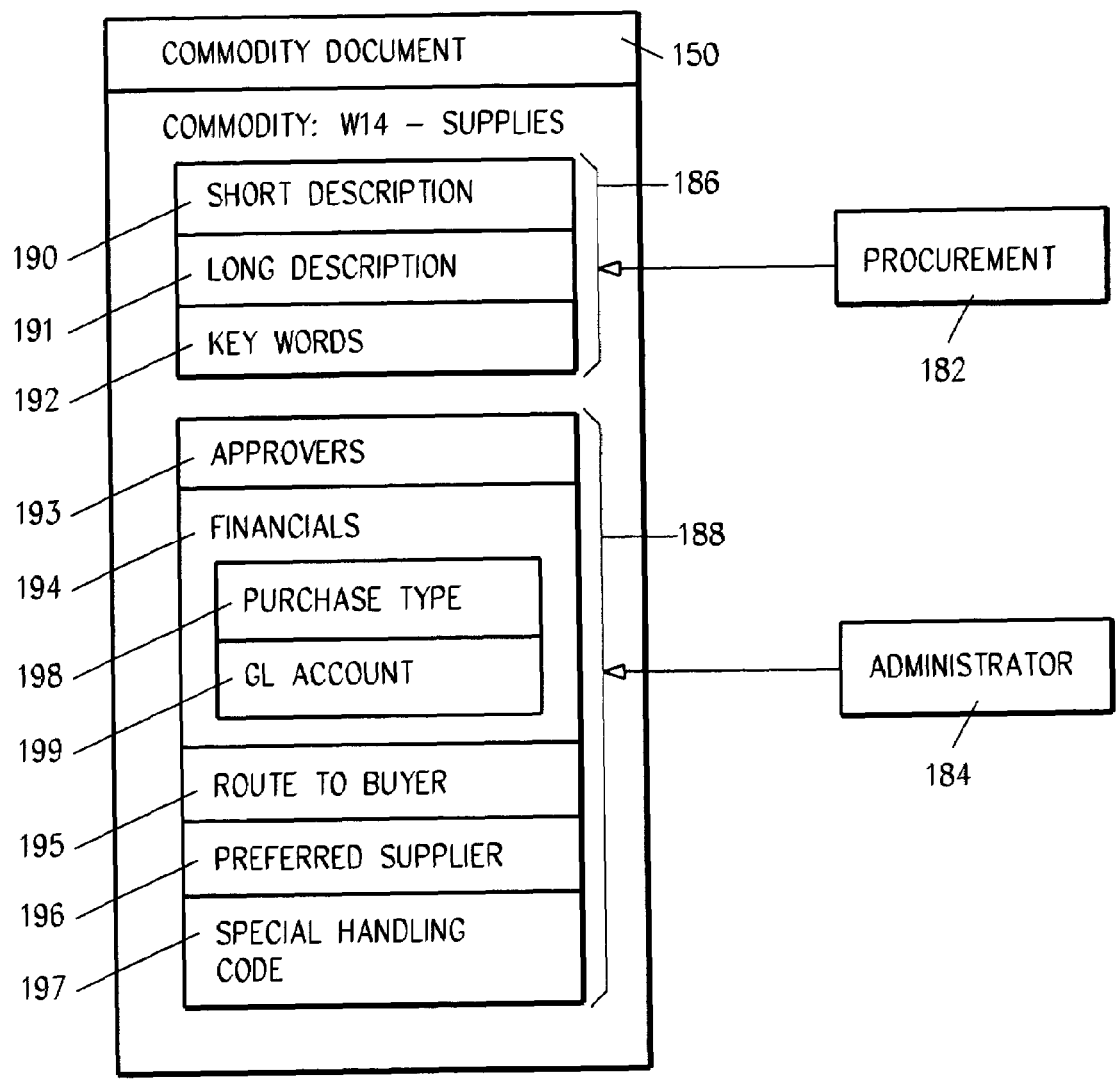
FIG. 9 is a diagram illustrating a commodity document.

Referring to FIGS. 7 and 9, the method of the preferred embodiment of the invention is described for managing a chart of accounts 140. When creating a commodity list, which includes expense, capital, and resale accounts 142, commodities descriptions 180 are pushed to the correct commodity group. The resulting chart of accounts 140 is available from SAP 382. Previously an administrator had input a chart of accounts. Now, a company administrator, for example, may select from commodity accounts 142 the expense field, which results in drop-down display of a valid chart of accounts 144 from SAP chart of accounts 140 with account numbers 148 and commodity descriptions 146. The company administrator may then select from that valid chart of accounts 144 the correct commodity to push to company/commodity document 150.

Figure 8:
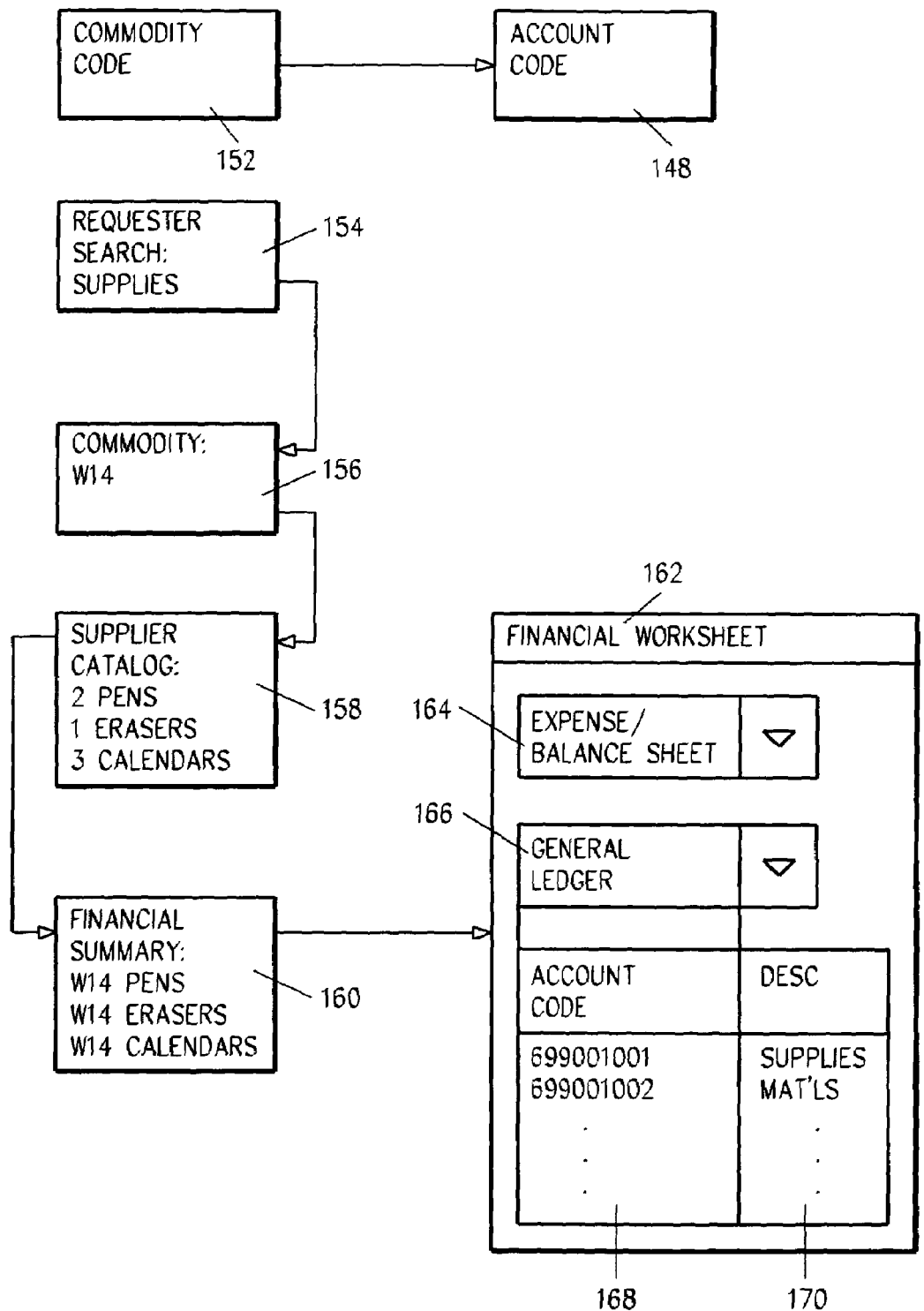
FIG. 8 is a diagram illustrating the mapping of commodity codes to accounting codes.

Referring to FIG. 8, the process for a requester to create requisition is set forth. By way of example, a requestor creates a requisition by doing in step 154 a search for "supplies", which will bring to him in step 156 a display presenting commodity W14, and thence in step 158 to a catalog (for example, a Staples catalog) which includes commodities (pens, erasers, calendars), from which the requester can create several line items. Upon selecting "proceed to accounting", the requester is presented a financial summary 160 including commodity code w14 pens for line item 1, w14 erasers for line item 2, and w14 for line item 3 calendars. The user may then request display of financial worksheet 162. In this window 162, the requester will see a title 164 expense, which can be changed, for example, by toggling to other categories, such as balance sheet. Selecting G/L account 166 may drop down a list showing several account codes 168 and related descriptions 170, depending upon what the company administrator has pushed to the commodity document 150 from which financial worksheet 162 is derived. Previously, a requester was provided in worksheet 162 one account code choice without description. By this invention, the requester is provided correct general ledger account codes and descriptions, resulting in less miscodes, more correct ledger entries, and correct SAP account codes. This improved general ledger account selection process avoids back end processing to correct erroneous entries.

Thus, in accordance with a preferred embodiment of the invention, a method is provided for creating a valid chart of accounts from which an administrator 184 can facilitate and enable a requisitioner to select a valid general ledger account. First, there is push from an enterprise (erp) system a chart of accounts 140 with descriptions to a req/cat system database. The administrator selects from req/cat system database valid accounts with descriptions for a given commodity and purchase time period, and then pushes the selected account/description tuple to the company commodity groups, thus completing the setup of the commodity documents 150 to be used in the requisition creation process. A company commodity document 150 created by administrator 184 may include for each commodity code under each company, commodity code 152, which is a very broad catagory, short description 190, long description 191 (from procurement organization 182), key words 192, approvers 193, financial information 194 (including purchase type 198, and general ledger account 199), route-to buyer 195 (by plant association), preferred supplier 196 (which associates the commodity code to a catalog 158), and special handling code 197 (with drop list including, for example, skills matching, obi, administrative services)—all used to drive the customer to the correct commodity.

To create a requisition, a user searches against commodities and catalogs in commodity description documents 150, which may be Notes documents or DB2 records, and creates one or more line items. These searches may be done by catalog and non-catalog, and driven based on descriptions entered by requester. A hierarchy of families may be provided as an alternative search approach. The requisitioner initiates a proceed to accounting process, which displays line items which may be selected by requisitioner; and then displays a financial worksheet created by a Java agent with fields which need to be selected or populated by the requisitioner from the company commodity document, based on purchase type, and which presents valid general ledger accounts numbers and descriptions to the requisitioner.

3. Back End (0107)

Figure 12:
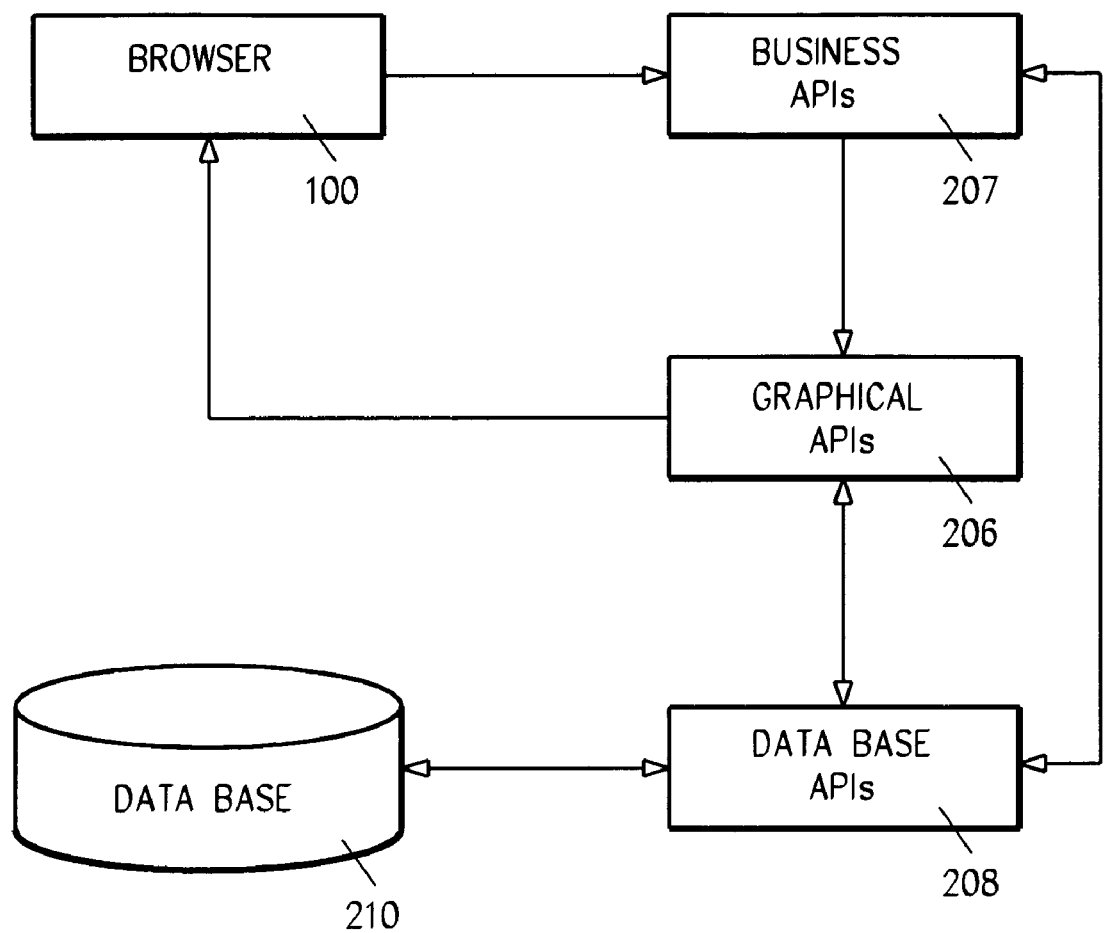
FIG. 12 is a diagram illustrating the interaction of API's with each other, a database, and a browser.

Referring to FIG. 12, in a large enterprise, the requisition catalog requires a very large database. In accordance with the preferred embodiment of the invention, such a large data repository is provided by the using the IBM DB2 relational database 210. Other possible databases include Oracle, Sybase, and MSSQL.

Lotus Notes databases are built upon an object model and classes: databases, views, and documents are classes used to access Notes data. But, these classes are set to be final and not extendible, and a Req/Cat Web database must be extendible.

Consequently, referring to FIG. 12, in accordance with an embodiment of the present invention, DB2 access routines 208 are provided for accessing DB2 data 210. The Req/Cat Web application executes Lotus code, with access controlled on the code, and data obtained from and written to relational database 210.

Normally, Notes saves all data as documents. There is a save method provided for that purpose. In accordance with a preferred embodiment of the invention, the Notes save method is intercepted and stopped, and execution passed to Req/Cat Web code for saving data to DB2. In the same way, execution of a Notes open method is intercepted and stopped, and then Req/Cat Web code executed to pull information in from DB2.

Lotus Notes provides for web applications, and supports methods called webqueryopenagent, and webquerysaveagent. Notes also provides a saveoptions parameter. Setting saveoptions to zero tells Notes not to save a document.

In accordance with the preferred embodiment of the invention, saveoptions is set to zero, and webquerysaveagent used to save data in DB2. The webquerysaveagent is written in Lotus Script, and calls Lotus Script extensions and also can also call its own APIs 200, 202, including the database api's 208. At this point, Req/Cat Web haves full control, and can save one or many tables, can explode the data model and write many tables.

On the other side, instead of editing an existing document as is done with Notes, Req/Cat Web executes createnewdocument. As the document opens, Lotus Notes gives the query webqueryopenagent, and this is also written in Lotus Script, which has access to data base api's 202, where data from many database 210 tables may be read to construct a Lotus document from DB2.

Figure 10:
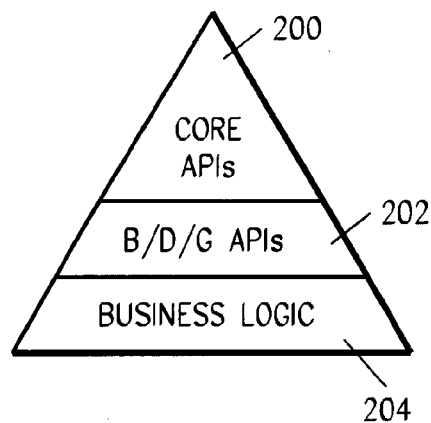
FIG. 10 is a diagram illustrating a pyramid structure of application program interfaces.

This configuration involves some naming standards and a hierarchy of interfaces. By way of example, database access routines are, by convention, data application programming interfaces (DAPI) 208. These are routines for accessing data 210 outside of the Req/Cat Web application. Referring to FIG. 10, a hierarchy of application program interfaces (APIs) includes core API's 200 containing everything necessary to connect to database 210. Next in hierarchy, to access specific data, are database API's (DAPI) 208, which interface to a single piece of data (such as company or employee information.) Below these rest the business logic code 204.

In a programming environment, the top of pyramid represents the work of a core DB2 programmer. Below him are those people who use core DB2 API's and write, for example, DAPI's 208 to access individual DB2 tables within database 210, for example API's for countries. These core APIs 200, therefore, include a GET method, and update, insert, and delete routines. Third level 204 represents the application programmer who only needs to use these methods (ie, company dapi: IBM US) in their business logic 204 applications, including ability to update, for example.

Figure 11:
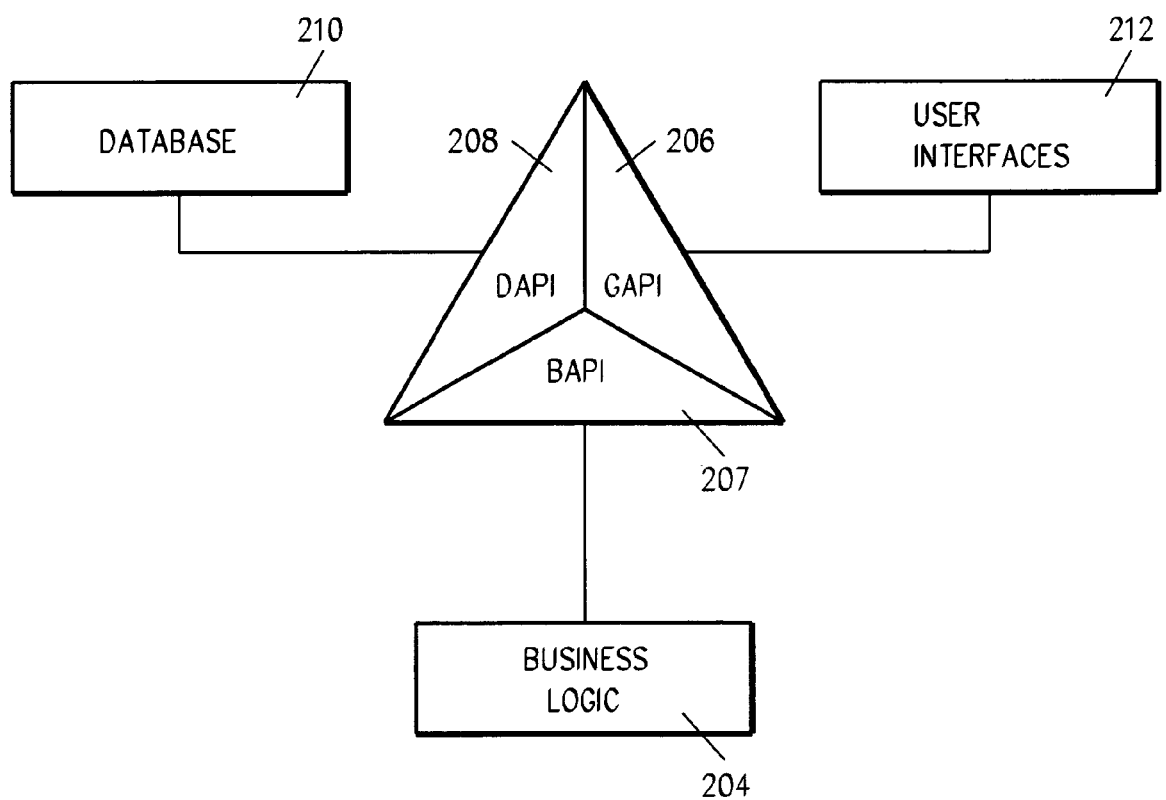
FIG. 11 is a diagram illustrating the graphical, database, and business logic API's of the pyramid structure of FIG. 10.

Referring to FIG. 11, this same pyramid is used to implement graphical APIs 206 on the user interface 212, business APIs 207 on the business logic 204 interface, and database APIs 208 on the database 210 interface. This illustrates that duties of programers can be separated, so that everyone need not know the complexities of the entire system. That is, some developers work on data manipulation, others on the user interface, and still others on business logic. The application developer need not know the names of the actual database, tables, or fields, or even how to access them. This also enables a DB2 administrator to alter a table, and only affect the one DAPI developer that wrote the specific table DAPI 202. All code is one routine, so changes to the database need only affect one piece of logic.

Figure 13:
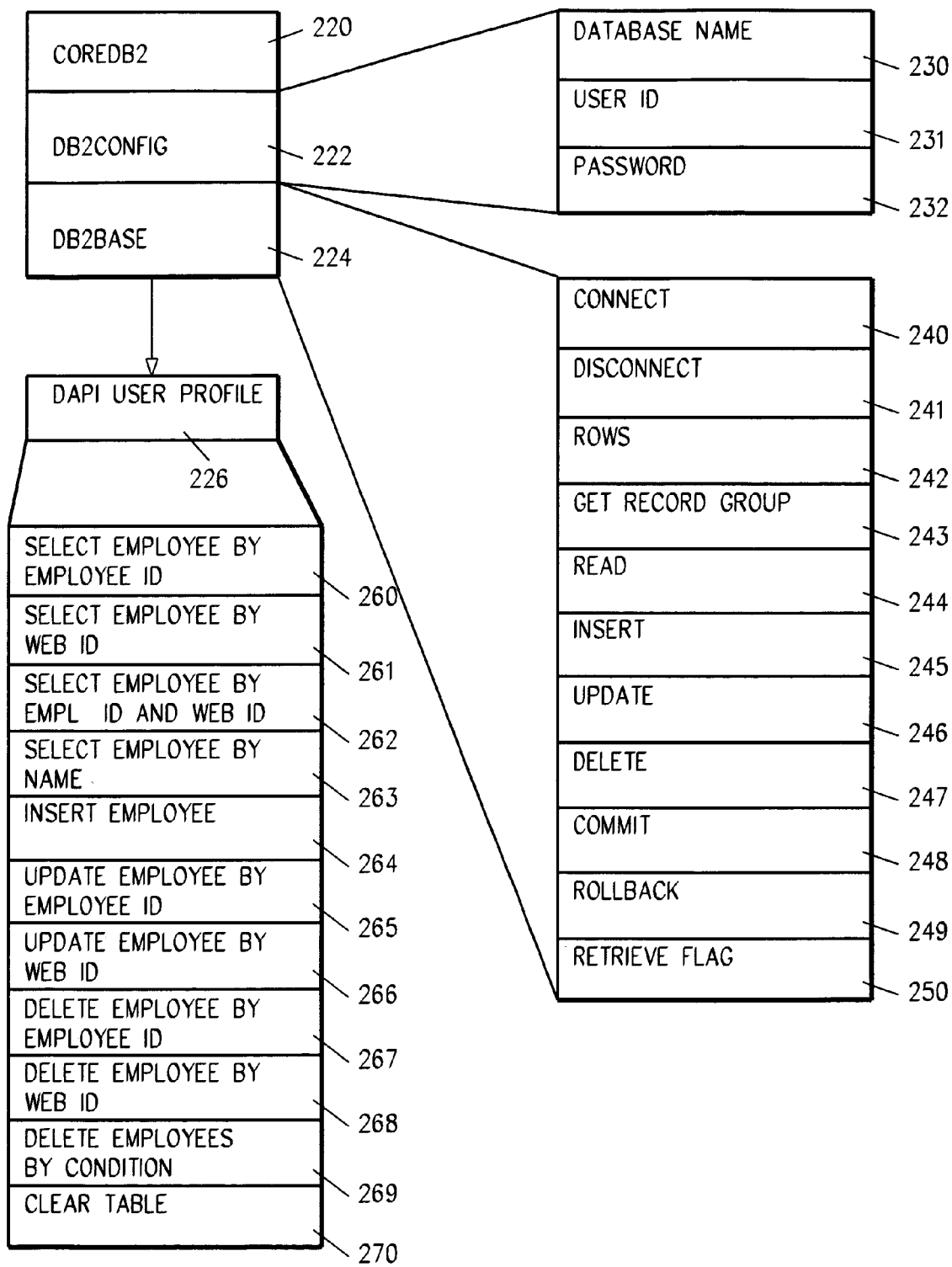
FIG. 13 is a diagram illustrating an example configuration of API's.

Referring to FIG. 13, an example of this API implementation is illustrated. CoreDB2 220 is the core API 200 to connect to DB2 210. It contains two classes, configuration class DB2Config 222 and base class DB2Base 224.

Calling DB2Config 222 determines database name 230, user identifier 231, and password 232—information that the database requires to establish a valid connection, and is passed to DAPI 208 for making that connection. (Without this method, user IDs and passwords would have to be hard coded in the application.)

DB2Base 224 is extended by the DAPI 208 programmer for each DAPI 202 instance that is needed. It contains methods 240, 241 for connecting to and disconnecting from the database, a method 242 for defining the number of rows to return at a time, a method 243 for getting the next group of records, methods for reads 244, inserts 245, updates 246, and deletes 247, commit 248 and rollback 249 options, and a flag 250 to determine if all data has been retrieved.

DAPIUserProfile 226 is a class for retrieving or updating information about an employee. It extends DB2Base 224 so the application 204 developer would not have to write the logic to access DB2 210, but could concentrate on the information about the employee. The DAPI 202 developer would need to know about the employee table (table and field names, for example) and would implement methods for selecting and displaying data. In an exemplary embodiment, DAPIUserProfile class methods include the following:

260 selectEmployeeByEmplID(employeeID,company-Code, countrycode)
261 selectEmployeeByWebID(employeeWebID)
262 selectEmployeeBothWays(employeeID,company-Code, countryCode,employeeWebID)
263 selectEmployeeByName(lastName,firstName)
264 insertEmployee(columnNames,DB2ColumnValues)
265 updateEmployeeByEmpID(employeeID, employee-CompanyCode,employeeCountryCode, UpdateNameValues . . . )
266 updateEmployeeByWebID(employeeWebID, UpdateNameValues,UpdateByUserID)
267 deleteEmployeeByEmpID(employeeID,company-Code, countryCode,UpdateByUserID)
268 deleteEmployeeByWebID(employeeWebID, UpdateByUserID)
269 deleteEmployeesWhere(Condition, UpdateByUserID)
270 clearTable( )

Once the data is selected, a few of the properties that are available for a given employee include empWebID, empLastName, empFirstName, empIntPhoneNum, empExtPhoneNum, empEmailID, empID, empCompanyCode,empCountryCode, and empCountryName.

Figure 14:
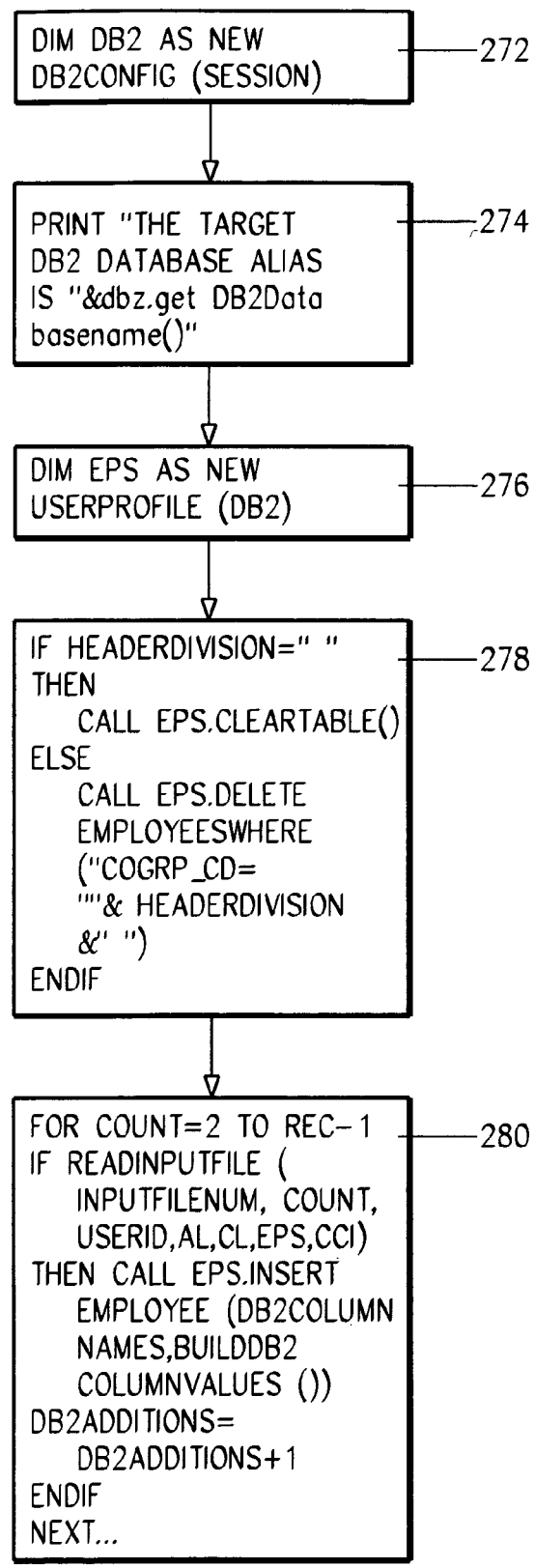
FIG. 14 is a flow diagram illustrating the operation of the userProfile class of FIG. 13.

An application 204 like the human resources (HR) application would then need to read HR data and insert it into the employee table if the employee did not exist, or update it if something changed, or delete it if the employee no longer exists. This application developer would then only have to know the methods and properties of the userprofile class 226 in order to write the application. An example of such an application is set forth in Table 2, with reference to the steps of FIG. 14. This table sets forth the HR load routine, a batch program to read HR data from a flat file and insert it into the DB2 user profile table.

TABLE 2

EXAMPLE APPLICATION

| 1 |  | 'in the following step, instantiate a DB2 config |
| 2 |  | object, and call it db2; the database name 230, etc., |
| 3 |  | is determined by instantiating the db2 config object, |
| 4 |  | as defined by the core programmers' |
| 5 | 272: | Dim db2 As New DB2Config (session) |
| 6 |  | 'the database information is known, and can be passed |
| 7 |  | to the employee profile.' |
| 8 | 274: | Print "The target DB2 database alias is "& |
| 9 |  | db2.getDB2DatabaseName ( )) |
| 10 |  | 'All that must be done is to pass the DB2 class to the |
| 11 |  | userProfile.' |
| 12 | 276: | Dim eps As New userProfile (db2) |
| 13 |  | 'Delete everything from the employee table to start the |
| 14 |  | bridge.' |
| 15 | 278: | I headerDivision = " " Then |
| 16 |  | Call eps.clearTable( ) |
| 17 |  | Else |
| 18 |  | Call eps.deleteEmployeesWhere("COGRP_CD= " " |
| 19 |  | &headerDivision &" ") |
| 20 |  | End If |
| 21 | 280: | For count = 2 To records−1 |
| 22 |  | 'Read the next record and make sure that it can be |
| 23 |  | loaded without problems' |
| 24 |  | If ReadInputFile(inputFileNum, count, userid, al, cl |
| 25 |  | eps, cci) Then |
| 26 |  | Call eps.insertEmployee(DB2ColumnNames, |
| 27 |  | BuildDB2ColumnValues ( )) |
| 28 |  | db2kAdditions = db2Additions+1 |
| 29 |  | End If |
| 30 |  | Next . . . |

In Table 3, a pseudo code example of use of the webquerysaveagent process is illustrated.

TABLE 3

WEQUERYSAVEAGENT EXAMPLE

| 1 | Dimension db2 As New DB2Config(session) |
| 2 | Print "The target DB2 database alias is "& |
| 3 | db2.getDB2DatabaseName( )) |
| 4 | Dimension eps As New userProfile(db2) |
| 5 | execute process 260 to selectemployee by employee id |
| 6 | if employee does not exist, then |
| 7 |    execute process 264 to insert employee |
| 8 | else if employee changed, then |
| 9 |    execute process 265 to update employee |
| 10 | else (employee not changed) information to user |
| 11 | "employee not changed" |
| 12 |    no save |
| 13 | endif |

In the example of Table 3, an application programmer 204 is using a dapi written by programmers 202.

In this manner, the relational database 210 is used as the data source, instead of a Notes database, in a way that hides the complexities of DB2 database programming. That is, in a fashion to similar Notes programming—the idea is to allow a Notes programmer to use a familiar looking class 226 to load and save data.

4. Catalog Administration

In accordance with the preferred embodiment of the invention, a requisition catalog administration function provides control, audit, and publishing procedures for flat files received from suppliers.

Figure 15:
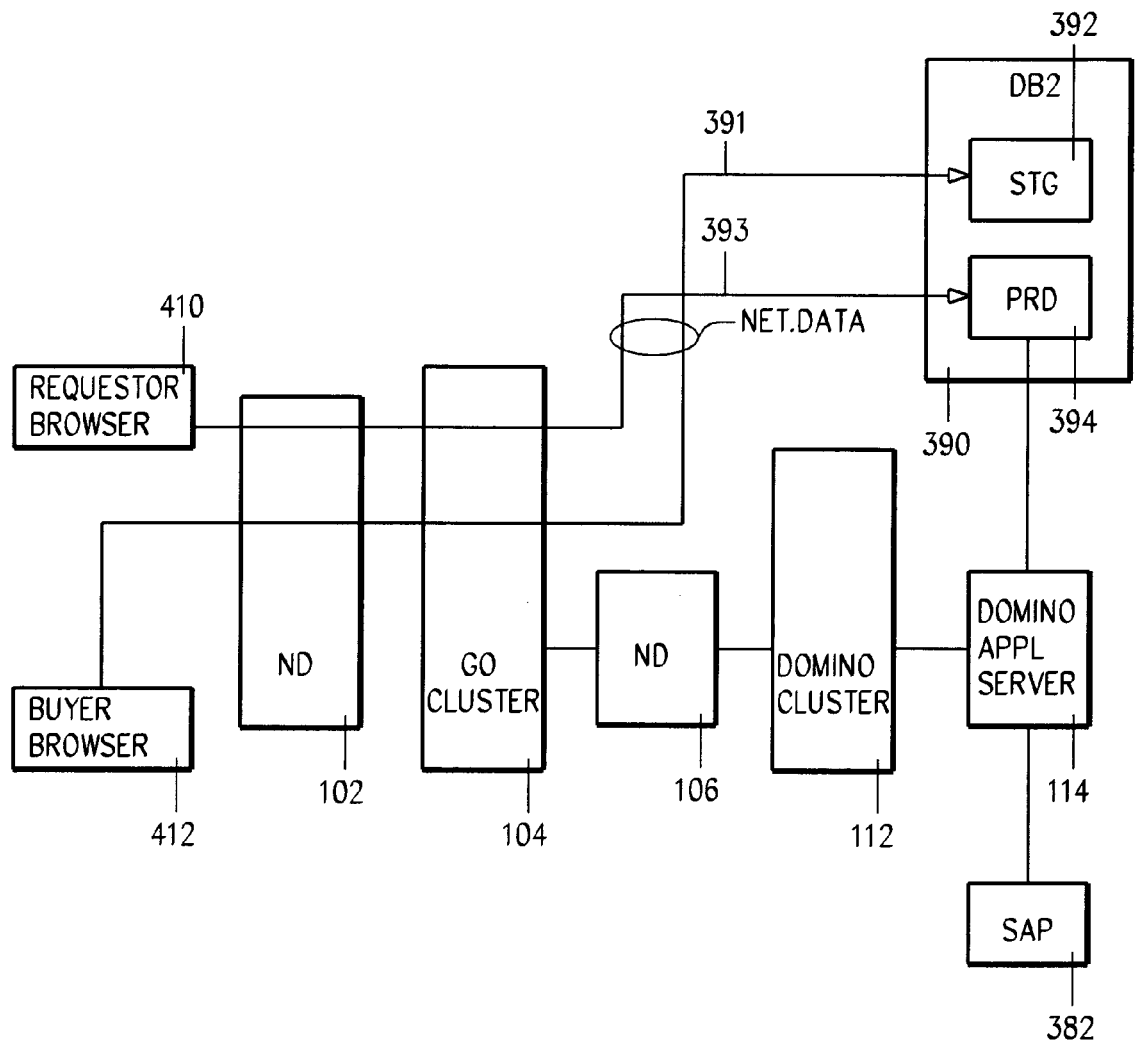
FIG. 15 is a system diagram illustrating the system of FIG. 1 for accessing a requisition catalog.

Referring to FIG. 15, a system architecture for implementing catalog administration includes a requester browser 410, a buyer browser 412, with net.data connections 391 and 393 to a dedicated DB2 server and DB2 database 390 having a staging table 392 and a production table 394 through network dispatcher 102 and Go cluster 104. Go cluster 104 is also connected through network dispatcher 106 and Domino cluster 112 to Domino application server 114. A buyer 412 accesses staging table 392 via net.data connection 391, and a requestor 410 accesses the production 394 table via net.data connection 393. This connection 391, 393 is implemented as a single path, and the requester and buyer provided different levels of authority to access different tables 392, 394 in DB2 390 over that same path. Buyer 412 can change selected fields in the staging table 392 and can update production table 394 from staging table 392. Requester 410 can only view (not change) the production table 394. The buyer at browser 412 is controlled by a GUI which contains access control list (ACL) control on fields, and edit authority for catalog access.

Figure 16:
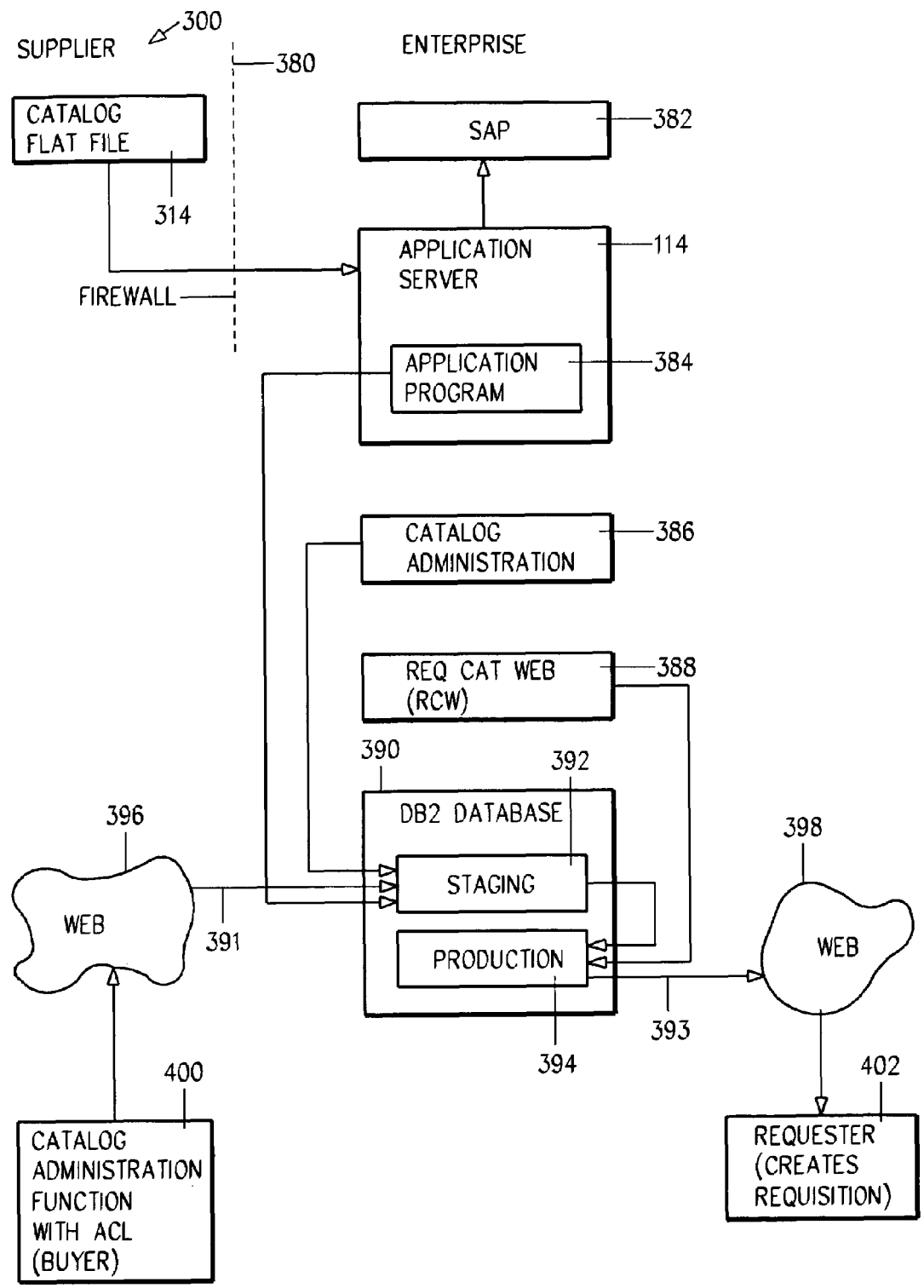
FIG. 16 is a system diagram illustrating a system for using a staged requisition catalog built from supplier flat catalog files.

Referring to FIG. 16, this architecture further includes a catalog flat file 314, an application program 384 within application server 114, catalog administration function 386, Req/Cat Web function 388, and WEB communications 396 and 398 connecting a catalog administration function with ACL control 400 and requester 402 to database 390.

In operation, catalog flat file 314 is received by application server 114 through firewall 380 via EDI and loaded into DB2 database 390 by application program 384. Catalog administration function 386 specific users 400 audit control over certain fields in staging table 392, and publishes the catalog data to the live, or production, system 394. Function 386 presents to buyer 400 a staging table 392 with a GUI front end, with selected fields enable and other fields not enabled to be personalized.

Catalog file 314 is a flat file containing catalog items in a column delimited format specified to supplier 300 by the enterprise.

Application server 114 manages database 390 containing staging table 392 and production table 394. A catalog file 314 comes to application server 114, which includes a program 384 for moving data from that flat file to staging table 392.

A buyer at terminal 400 accesses the staging table 392 on the web 396. He views catalog items and enters transactions with action button which transfers information from staging table 392 to production table 394. Production table 394 is referenced by req cat web 388, and staging table 392 is referenced by the catalog administration function 386 operated by the buyer 400. Typically, a buyer is member of procurement organization with responsibility for negotiating deals with suppliers. A requester 402 accesses production table 394 over web 398 to create and submit a requisition to SAP 382.

In accordance with the preferred embodiment of the invention, control over what buyer 400 can change is provided by a GUI in a process which loads a catalog 392 from a supplier into a production system 394.

Catalog files 314 come in from suppliers in an enterprise defined standard format, and the access to fields in that format is hard coded into the catalog administration function 386. Application server program 384 has error checking functions to assure validity of a catalog 314 from a supplier 300. Buyer 400 accesses staging table 392 through a catalog administration function 386 which has hard coded into it the access controls on the various fields in the catalog format. Production table 394, which is accessed by the requester 402, is updated periodically (upon buyer actuation) from the staging table 392.

Implementation of the invention involves several code procedures: there is a program 384 which loads a file 314 that is received via EDI into a table 392 in DB2. There are routines 388 which allow a buyer 400 to browse certain catalogs in the staging table 392 and change certain fields while being inhibited from changing others. And there are the routines 386 which take the approved catalog and migrate the data from the staging DB2 table 392 to the production DB2 table 394.

Figure 17:
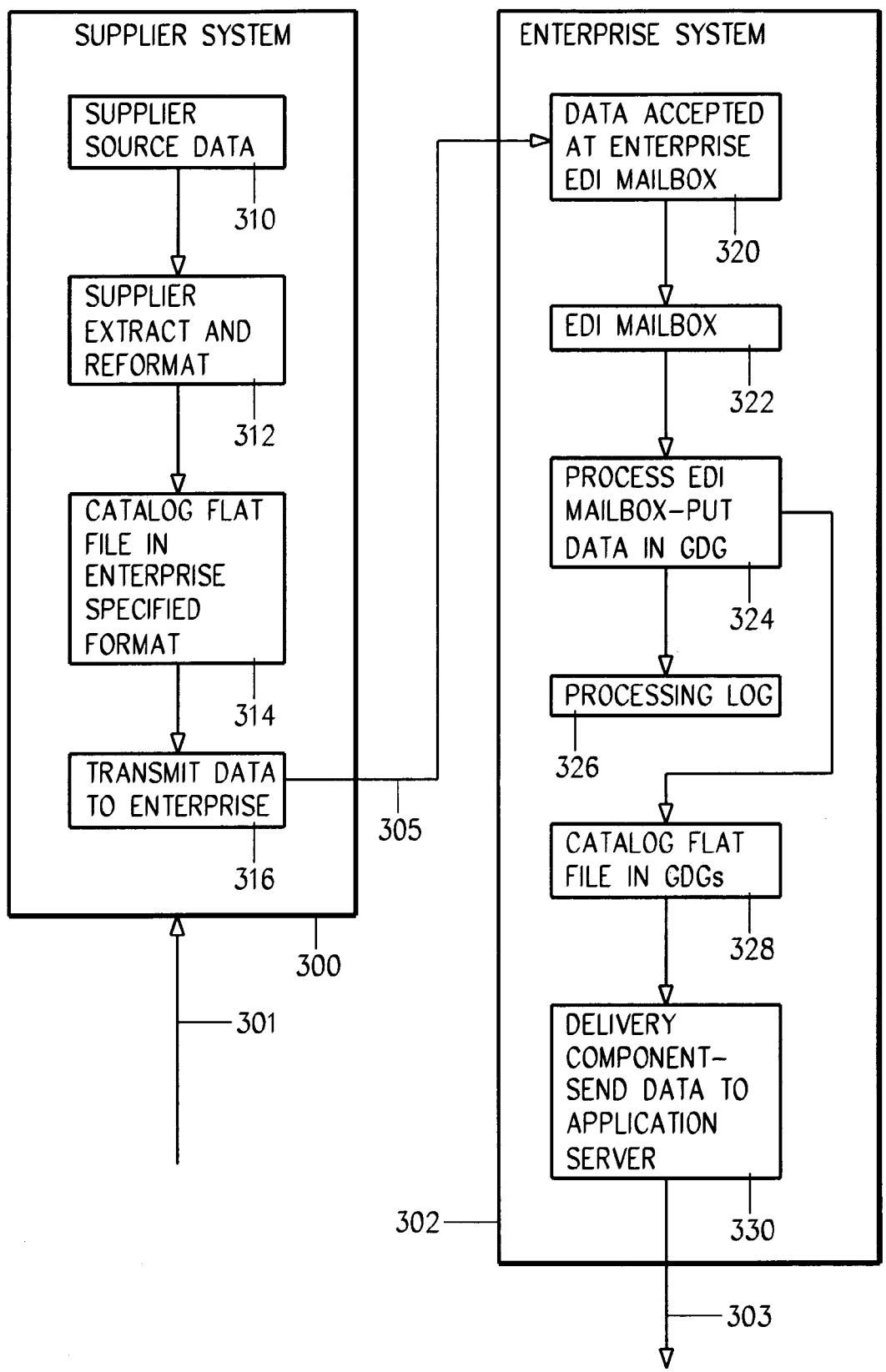
FIG. 17 is a flow diagram illustrating the steps for receiving a supplier flat catalog.

Referring to FIG. 17, a preferred embodiment of these processes are presented. In supplier system 300, supplier source data 310 is extracted and reformatted in step 312 to create catalog flat file 314 in the format specified by the enterprise. In step 316 that flat file is transmitted to the enterprise 302, as is represented by line 305, where it is accepted in step 320 into the enterprise EDI mailbox 322. In step 324, the data in the flat file in mailbox 322 is reformatted and put into generation data group (GDG) 328, a location for saving more than one file, so as to retain the last N iterations, and a archive entry made to processing log 326. In step 330, a delivery component executes to send data from GDG 328 to application server 114, as is represented by line 303, in the form of catalog flat file 340. In step 342, a delivery component receives the flat file and, as is represented by line 347, starts job scripts including MASSLOAD for reading the flat file and loading staging table 392, and as represented by line 345 alerts the buyer 352. As is represented by lines 311, 313 and 315, respectively, MASSLOAD 344 accesses database server 306 procedures catalog_s 360, product_s 362, and Req/Cat Web 364, and makes an archival entry to processing log 346.

Catalog_S 360 is the staging table 392 for the catalog profile, which provides for each catalog the supplier name, the start and end dates of catalog validity, the currency, and so forth.

Product_S 362 is the staging table 392 that holds the catalog parts, a listing by part number of price, description, and so forth.

Req/Cat Web validate procedure 364 is a Java stored procedure for performing the initial validation of data received in flat file 340.

Front end 370 is a GUI used by the buyer, for example to update the catalog 366.

In operation, validation procedure 364 validates the format and identifies catalog changes to product_s 362, logging those changes in file 332. It then checks a flag in catalog 366, and if the flag is on invokes procedure 350 provided catalog_s 360 does not indicate any critical errors. Validate and load procedure 350 then moves the contents of product_s staging table 362 into the appropriate production table 368, writing any errors to processing log 348. (In the event that procedure 364 does not call procedure 350, then buyer 352 intervention is required via GUI 370.) After procedure 364 completes execution, it may either stop, or if catalog 366 has a flag set on and catalog_s staging table 360 indicates no critical errors, then procedure 364 will invoke validation and migration procedure 350. After validate procedure 364 completes, it has written to prod_message_s file 332, and the buyer may use GUI 370 to read messages from file 332 and make any desired changes to staging table 362. They buyer may also choose to reject the catalog and, via step 354, contact the supplier to restart the process. This occurs if there is an error in the unit prices, which is an example of information in the catalog which a buyer is not authorized to change on his own.

After the buyer has used GUI 370 to make the values in staging table 362 acceptable, he sets the flag in staging table 360 which allows migration procedure 350 to run to move data from staging table 362 into production table 368, a relational database, such as Net Commerce (NC) or IBM DB2.

5. Role Table GUI

A preferred embodiment of the invention provides through use of a role table in DB2 database 129 (FIG. 3, or 390 in FIG. 16) very flexible access to DB2 tables without requiring involvement by a database administrator (DBA) to issue grants against the tables, thus bypassing the problem caused by Notes agents all coming from the same user (the Notes server ID).

Everything in Lotus Notes, even code, is in documents which require access control list (ACL) controls on access. Consequently, the preferred embodiment of the invention uses Notes ACLs to access code. However, when accessing data, a role table 420 (see FIG. 19) is used to build roles and permissions, and an object model is provided to generically access data from database 210, thus extending Notes to access a non-Notes data source 210. In order to configure DB2 to work in a Notes application environment, a single sign off is provided after getting through Notes code ACLs. This does not involve use of any of DB2's role tables and grants, but rather a single web ID 434 known to the Notes code to access the DB2 data.

Figure 19:
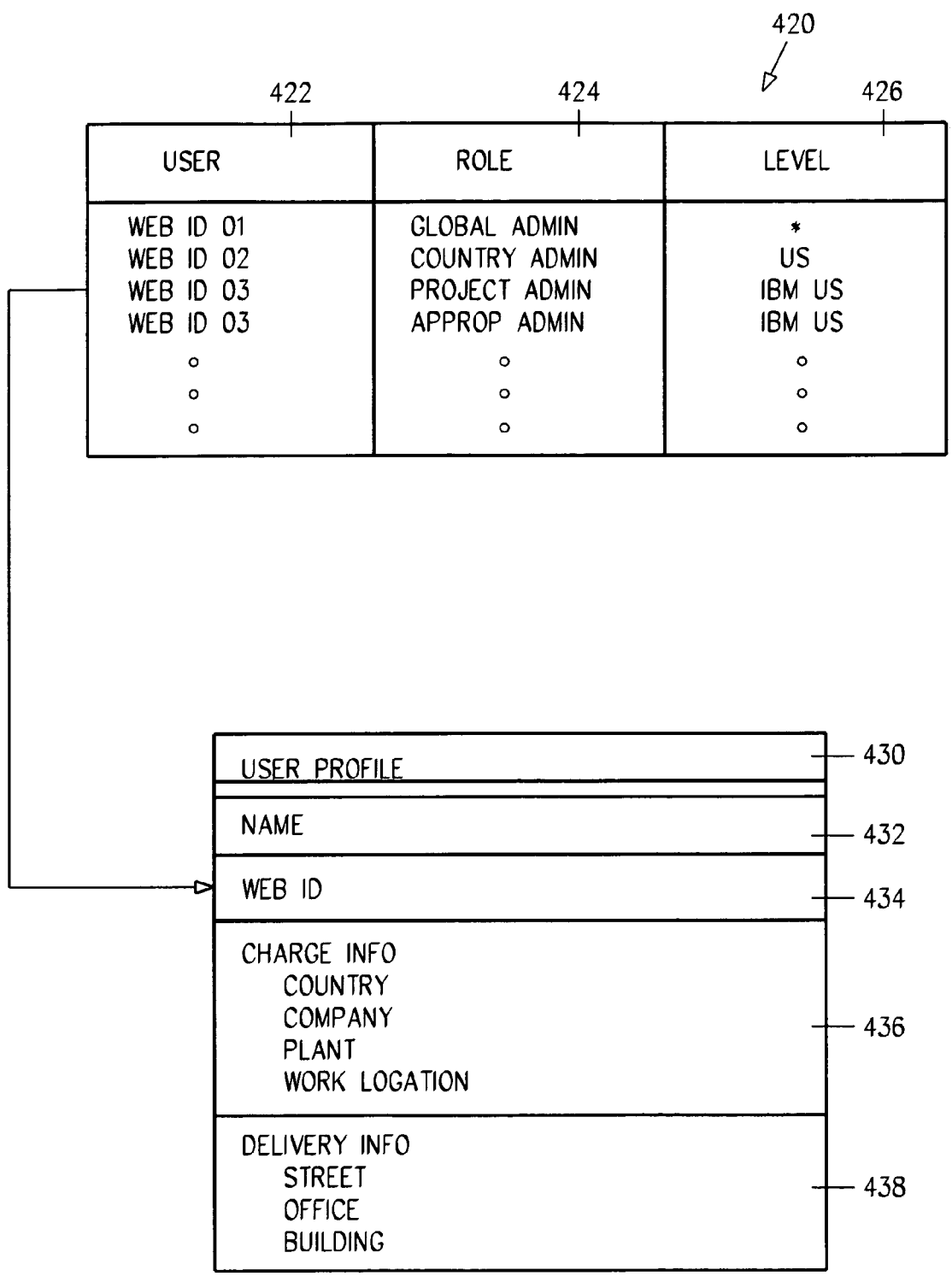
FIG. 19 is a diagram illustrating a user profile.

Referring to FIG. 19, role table 420 includes for each of a plurality of user WEB ID's 422, the associated role 424 and level 426 of granularity at which the user is associated with the role. Example: for a role 424 of country administrator, the level 426 is the country id, and user with web ID 422 of 02 can update contract profiles for that country.

Any person at a browser 100 attempting to access a row in a DB2 table 390 must pass the role table 420 check. Further, for accessing a supplier table in DB2 390, anyone can view the list of suppliers in the application that applies to the requesters country, but only the country administrator can update them.

User 422 identifies a user profile 430, which specifies the user name 432, web identifier 434, charge information 436, including country, company, work location) and delivery information 438 (including street, office, and building).

Thus, in accordance with the preferred embodiment of the invention, the web ID 434 for the browser user is used to control access to the Notes databases and to the DB2 databases. The Notes databases have code and documents which the user must access (including contract profiles, cost center profiles) and also tables in the DB2 database. A user must access both Notes databases and DB2 databases, and access to all of these databases is controlled based on the user web ID 434 through the use of role table 420.

In order to make and use the preferred embodiment of the invention, an implementer and user would do the following:
1. Determine what levels of granularity are relevant to the application. (For example, the company that the user belongs to, the country, etc.)
2. Populate the DB2 table 420 with Web IDs 434 and associated roles 424 and levels 426.
3. Write procedures to locate a user 422 in table 420 and pull out associated roles 424 and levels 426.
4. Provide code routines or functions using these procedures which are authorized for execution by users with specific roles and levels.

Code using these routines would then compare the roles and levels to the specific role and level that is required based on the function. For example, a user could be defined as a country administrator for France and a company administrator for a small company in the US. A routine that updates accounting information for the small company would not care about the country-level authority, so would look in role table 420 for company administrator role 424 for this user web ID 422. The level 426 of the role 424 would further restrict this user 422 from updating the accounting information for any company in the US other than the one corresponding to the level 426 to which he is assigned.

The invention allows a person's access to DB2 tables to be limited by the contents of a second db2 table rather than the grants issued by the DBA. In the Notes environment of the preferred embodiment of the invention, the ID which is actually granted the authority to the table is the Notes Server machine since the server accessing the db2 tables is the Notes server. Since the user web id is once removed, this provides a mechanism for applying a level of authority to the user to then apply to the db2 table. That mechanism is the role table.

Table 4 lists and describes the Req/Cat Web tables of the preferred embodiment of the invention.

TABLE 4

REC/CAT WEB ADMINISTRATION TABLES

| ADMINISTRATION FUNCTION | TABLE | DESCRIPTION |
| --- | --- | --- |
| Access Authority | REQCAT.TROLE_AUTHORITY | Maps a user to a role and the qualifier for that role (i.e., what level) |
| | REQCAT.TROLE_CODE | Defines the list of valid roles - Global Admin, Country Admin, etc |
| Account numbers | REQCAT.TACCOUNT_PROFILE | Holds account codes to be validated against |
| | REQCAT.TLACCOUNT_PROFILE | |
| | REQCAT.TACCT_PROF_DETAIL REQCAT.TLACCT_PROF_DETAIL | Provides details about the account codes |
| | REQCAT.TACCT_VALIDATION1 | Holds account codes to be validated against, as well as what type of validation is occurring (i.e., against BMS, Remind, Project numbers, Customer numbers, etc) |
| | REQCAT.TACCT_VALID_TYPE | Defines the list of validation types |
| | REQCAT.TCOMP_COA REQCAT.TLCOMP_COA | Defines the GL account numbers that are available for each company code, and provides a translated description |
| Approver routing | REQCAT.TAPPROVER_ASSIGN | Links an approver to a type and a code (i.e. I/T 0001) |
| | REQCAT.TAPPROVER_PROFILE | Defines the approver's name, Web ID, etc. |
| | REQCAT.TAPPRV_TYPE_PROF | Defines the types of approvers available to the application (capital, financial, I/T, chemical, safety, tax) |
| | REQCAT.TCATLG_APPROVAL | Allows a catalog administrator to flag a catalog item as requiring chemical or safety approval in specific locations. For example, toner is not considered a chemical item except in Vermont, because of special environmental laws in that state. |
| Buyer routing | REQCAT.TBUYER_PROFILE | Defines the owner of a buyer code and contact information |
| | REQCAT.TBUYER_ROUTING | Links a buyer to a commodity |
| | REQCAT.TBUYER_SUPPLIER | Links a buyer to a supplier |

TABLE 4-continued

REC/CAT WEB ADMINISTRATION TABLES

Figure 18:
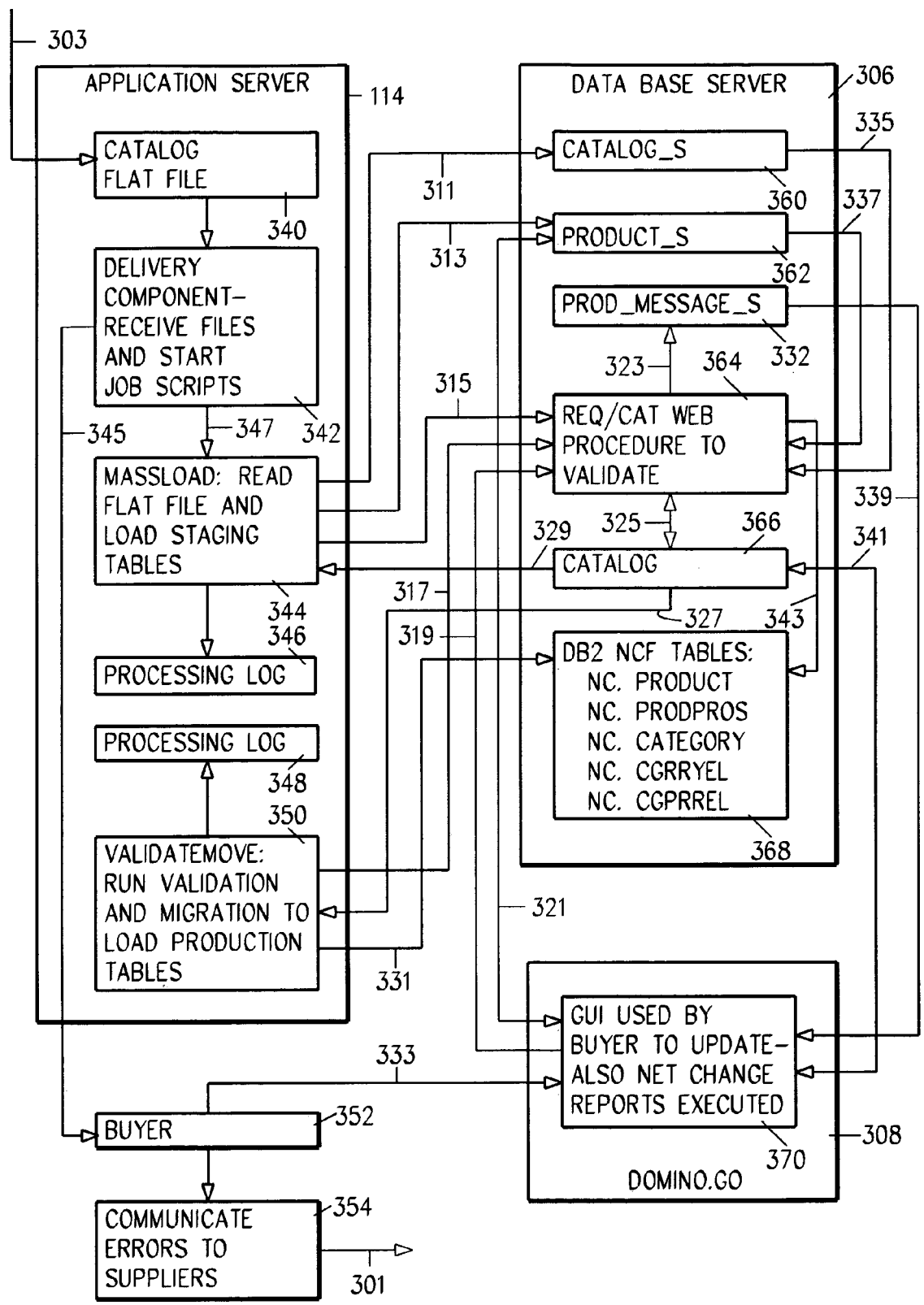
FIG. 18 is a flow diagram illustrating the steps executed by an application server and database server for building and accessing a requisition catalog.

| ADMINISTRATION FUNCTION | TABLE | DESCRIPTION |
|---|---|---|
| Catalog profiles | RC.CATALOG | Defines the characteristics of a catalog - supplier, expiration date, currency, etc. |
| | RC.CATPLREL | Defines the plants which are allowed to access this catalog |
| Commodity families | NC.CATEGORY | Defines the global list of commodity groupings |
| Commodity codes | RC.COMMOCODE | Defines the global list of commodities and identifies which family each belongs to |
| Company commodities | RC.COMMCOMP | Not all commodities may be valid for all companies. This table identifies which commodity codes the company wants to use. |
| | REQCAT.TCOMMCOMP_BUYER | Some commodities require that the user select a buyer from a predefined list. This is the predefined list. |
| | REQCAT.TCOMM_COMP_COA | This associates GL account codes with the commodity code. |
| | REQCAT.TCOMM_WLOC_RCV | This defines for which work locations this commodity is 'receivable'. This flag is forwarded to SAP for further use in receiving locations |
| | RC.SUBCOMMODITY | Some commodities are too broad and the need exists for sub-dividing the goods under this commodity so that different suppliers and different purchase processes can be used. |
| | RC.SUPPSUBCOMM | This links a supplier to a specific subcommodity. |
| Companies | RC.COMPANY | Associates SAP company codes with associated country. For example, IBM US contains three company codes for IBM, Lotus, and Tivoli. |
| Countries | RC.COUNTRY | Holds the list of ISO country codes, i.e., US, FR, DE, etc |
| Company groups | REQCAT.TCOMPGRP_TYP_PROF | Defines the list of valid grouping types, such as ACCOUNT, UPROF |
| | REQCAT.TCOMPGRP_PROFILE | Defines the list of group names and links them to their types, such as IBMUS - ACCOUNT and IBMUS - UPROF |
| | REQCAT.TCOMPANY_ | Lists the company codes that belong to the specified grouping |
| Plants | RC.PLANT | Associates plant codes with company and country. A company can have many plants, a plant may belong to only one company. |
| Suppliers | RC.SUPPLIER | Defines the characteristics of a supplier - name, code, contact information, location |
| | RC.SUPPCOMP | Defines which company codes may reference this supplier for purchasing |
| Work locations | REQCAT.TWORK_LOCATION REQCAT.TLWORK_LOCATION | Associates work locations with plant, company, and country. A plant can have one or more work locations, a work location may belong to only one plant. |
| | REQCAT.TWORKLOC_DELTOADDR | For those work locations which have a predefined CDC (Chemical Delivery Center) address |
| User profiles | REQCAT.TEMPLOYEE_PROFILE | Holds employee information |
| Catalog parts | see FIG. 18, DB2 NCF tables 368 | Hold part information, category / subcategory information, etc. |

6. Relational DB Agents

In accordance with a preferred embodiment of the invention, in a Notes/DB2 hybrid environment, a Notes agent reads data from a DB2 table, and then dynamically populates that data to an HTML page. In this manner, an the existing infrastructure (including Notes, Domino Go, and DB2) is used to combine HTML and Java script web presentation with DB2 data.

Figure 20:
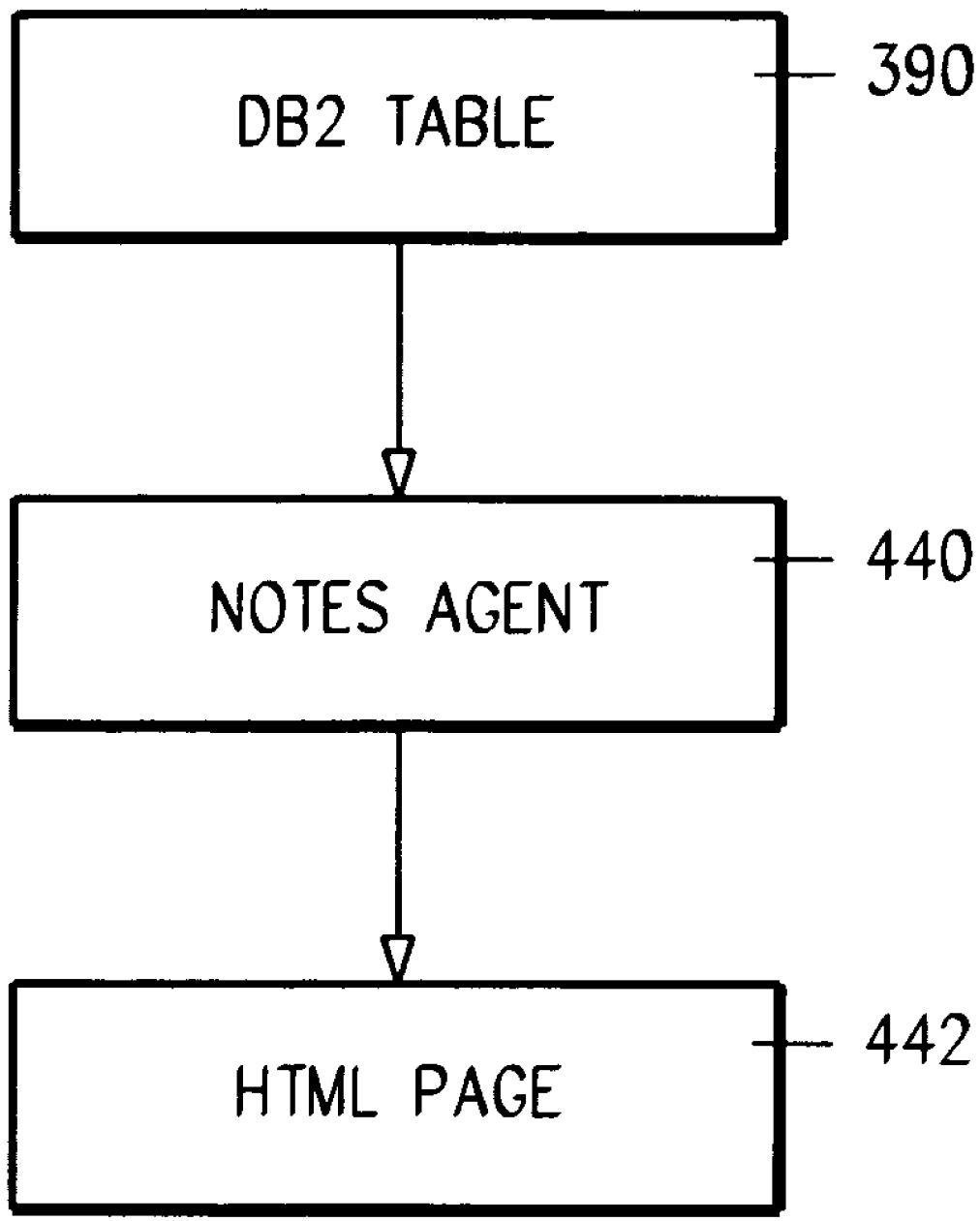
FIG. 20 is a diagram illustrating a Notes agent for building an HTML page from a DB2 table.

Referring to FIG. 20, Notes agents 440 are used as intermediaries. Each such agent 440 reads DB2 tables 390, collects data using SQL select statements, and builds web page 442 dynamically, writing out the Java script and HTML to present the page on a Web browser, such as Web browser 100. The results of the DB2 searches also helps to determine which HTML needs to be written, something which standard HTML cannot handle. Thus, conditional logic may be used.

A plurality of agents 440 are provided. The premise is the same in all: figure out who is asking, and then tailor what is shown by what they are authorized to see. The example of Table YY is the supplier profile agent.

This process makes use of the Notes connection function lsx:lc. This Lotus Script connection is a built in API for connectivity to relational databases. The lsx:lc connector is a Lotus provided API which allows connection to DB2.

For example, to display a list of supplier profiles, two DB2 tables 390 must be read: one provides a list of suppliers and the other is role table 420 (FIG. 19). When role table 420 is read, the code tests the users ability to edit (country admin for country of supplier), and may display the web page differently depending thereon. A dynamic feature of the invention is that straight text may be displayed, or with text with hyperlinks to open a supplier profile, as an example.

To make and use this preferred embodiment of the invention, the following is done:

1. Use the Lotus Script lsx:lc connector connect to DB2.
2. Depending on the DB2 table being read and the functions required, write functions to Create, Read, Update, and Delete with respect to the DB2 table.
3. Write the HTML to display the page, and then have the Notes agent 440 Print these HTML commands to the browser so that they appear in a meaningful presentation to the end user.
4. Use conditional logic to change the look of the page 442 based on the results of the DB2 390 lookups.

Inputs to the method of this embodiment of the invention include the DB2 table to be read or updated, and the output includes HTML conditionally generated based on results of the DB2 table reads.

The HTML page being populated may, for example, provide a list of suppliers. Such pages may also be used in the requisition or configuration area of the application, displaying commodity codes, suppliers, and so forth.

TABLE 5

EXAMPLE AGENT 440

```
 1  This agent is invoked from the administration tab for 'supplier'. It
 2  is presenting the user with a view of suppliers that have been
 3  configured on the system. Based on the access authority of the
 4  user, this list will be presented either as just text, for the general
 5  user, or as hotlinks for an administrator to then open an
 6  individual supplier profile and update it.
 7  Sub Initialize
 8  //setting up variables
 9     Dim src As New LCConnection ("db2")
10     Dim fldLst As New LCFieldList(100)
11     Dim suppname As LCField
12     Dim suppcode As LCField
13     Dim InfoView As AllInfoView
14     Dim session As New NotesSession
15     Dim doc As NotesDocument
16     Dim sqlQueryString As String
17     Dim flag As Variant
18     Dim admin As Integer
19     Admin=True
20     Dim lclsxSession As LCSession
21     Dim supplierdb As notesdatabase
22     Dim configview As notesview
23     Dim configdoc As notesdocument
24     Dim lookuptype As String
25
26     On Error Goto errHandler
27
28     Set supplierdb= session.currentdatabase
29     Set configview = supplierdb.getview("APPVIEW")
30     Set configdoc = configview.getfirstdocument
31     lookuptype = configdoc.HRFormat(0)
32
33     Set doc=session.DocumentContext
34     Set InfoView=New AllInfoView
35
36  //connect to DB2
37     InfoView.ConnectToDB2
38  //Query the role table for users roles and authority levels
39     If Not InfoView.CheckAdminPrivilegesOK
        (doc.CurrentUserName (0)) Then
40         Admin = False
41     End If
42     InfoView.DisconnectDB2
43
```

TABLE 5-continued

EXAMPLE AGENT 440

```
44     If (Admin = False) And (lookuptype = "DON")Then
45         Print"<script>alert('You are not authorized to View Supplier
46  documents Please contact your procurement administrator if
47  you have questions');"
48         Print "history.go(-3)</script>"
49         Exit Sub
50     End If
51
52  //Begin printing out HTML from the agent
53  Print "<link rel=stylesheet type=" "text/css" "href=" "/transform
54  /reqcat/css/default_styles.css" ">"
55
56     Dim db2c As New db2config(session)
57  //Connect to DB2
58     src.database = db2c.getDB2DatabaseName( ) '"reqcat41"
59     src.Connect
60
61  //build the SQL Query
62     sqlQuerystring = "select SUNAME, SUID from RC.SUPPLIER"
63     sqlQueryString = sqlQueryString & " order by SUNAME"
64
65     If (src.execute(sqlQueryString, fldLst) = 0) Then
66         Print "You do not have any supplier profiles to view."
67         End
68     End If
69
70     Set suppname = fldLst.Lookup ("SUNAME")
71     Set suppcode = fldLst.Lookup ("SUID")
72
73  //Print more HTML
74  Print "<TABLE width='100%' cellpadding='0' cellspacing='0'>"
75     Print "<BR><TR><TD class=" "banner" " bgcolor=" "3366cc
76  " " align=" "center" "> Suppliers</TD></TR>"
77
78     Print "</TABLE>"
79
80  //If the user is an admin, then provide a button for adding new
81  suppliers
82     If Admin Then
83         Print "<form>"
84         Print "<input type='button' name='mybutton' value='Add
85  Supplier Profile' onClick=" " javascript: document.location.href=
86  './SUPPLIER?OpenForm';" " >"
87         Print "</form>"
88     Else
89         Print "<BR>"
90     End If
91
92     Print "<table cellpadding=2 cellspacing=0 border=0>"
93     Print "<tr><td class=" "bannersublevel" " ><B> Supplier</B>
    </td>"
94     Print "</tr>"
95
96  //Toggling background color on alternate rows
97     flag = True
98
99     While (src.Fetch (fldLst) > 0)
100        If (flag) Then
101            Print "<tr bgcolor=#CCCCCC>"
102            flag = False
103        Else
104            Print "<tr bgcolor=#FFFFFF>"
105            flag = True
106        End If
107
108  //If user is an admin, then print the supplier name as a hotlink
109        If Admin Then
110            Print"<td class=" "field" "><a href=./SUPPLIER?
111  OpenForm&" & suppcode.text(0) & ">"&suppname.text(0)
    &"</a></td>"
112        Else
113  //otherwise just print it as text
114            Print"<td class=" "field" ">" &suppname.text(0) &"</td>"
115        End If
116        Print"<td class=" "field" ">" &suppcode.text(0) &"</td>"
117        Print "</tr>"
118     Wend
```

TABLE 5-continued

EXAMPLE AGENT 440

```
119   Print "</table>"
120   End
121
122 errHandler:
123
124   Print "<br>" & session.currentagent.name & " - Line # "
125 &Str(Erl) & " // Error " & Str(Err) & ": " & Error$
126   If (lclsxSession.Status <> LCSUCCESS) Then
127      Dim text As String
128      Dim extcode As Long
129      Dim exttext As String
130
131      Call lclsxSession.GetStatus (text, extcode, exttext)
132      If (lclsxSession.Status = LCFAIL_EXTERNAL)Then
133         Print "<br>DB2 message: " & exttext & " code #" &
134 Cstr(extcode)
135      Else
136         Print "<br>Connector message: " & text
137      End If
138   Else
139      Print Error$
140   End If
141
142
143 End Sub
```

7. Data Transfer

In accordance with the preferred embodiment of the invention, a system and method is provided for transferring to a Req/Cat Web (RCW) application in a timely manner large quantities of data from web sites that exist outside of a firewall, or internal applications within the firewall but outside of the Req/Cat Web application.

For the purpose of the description of this embodiment, RCW exists in a frame set in a browser. A frame set divides a screen into logical and user-friendly sections called frames. As part of security for browser 100, Netscape and Internet Explorer (IE) establish ownership of the frames: each frame is a window under control of browser 100. Browser 100 can open up a session in any frame desired. However, if all of the frames open on a browser are not owned by same session, then these frames cannot see the contents of each other.

Consequently, the problem is presented: if RCW needs to access an outside supplier site 300 for information to get back through one its own the frames, as soon as data is written by that other site into one of the frame at browser 100, RCW no longer owns the frame and cannot access the information. So this aspect of the invention is concerned with data passing.

In accordance with the preferred embodiment of the invention, the supplier 300 opens a new window through normal Java script commands and writes its data into it, along with the name of the agent to run in RCW application server 114. That new window then calls one of the RCW processes, which is able to see the data because it is not in a frame and is therefore available for RCW to access. That process causes an agent to runs (in RCW) that can see that data and write it to a frame on the RCW side, resulting in RCW owning both the data and the frame. This allows RCW to reach NOTES information, and write that information to other frames. RCW owns the data and the frame. Ownership is established in the RCW application.

Consequently, by carefully tracking and controlling the sequence of opening windows, RCW can establish the origin from which data is coming, where the data is going, and which process owns it.

Those are the high points. Review: two sites are talking to each other using an intermediate window, doing a handoff of data and of ownership of both data and frame such that when it is time to supply information to the RCW application, RCW owns the data, frame and process.

Figure 21:
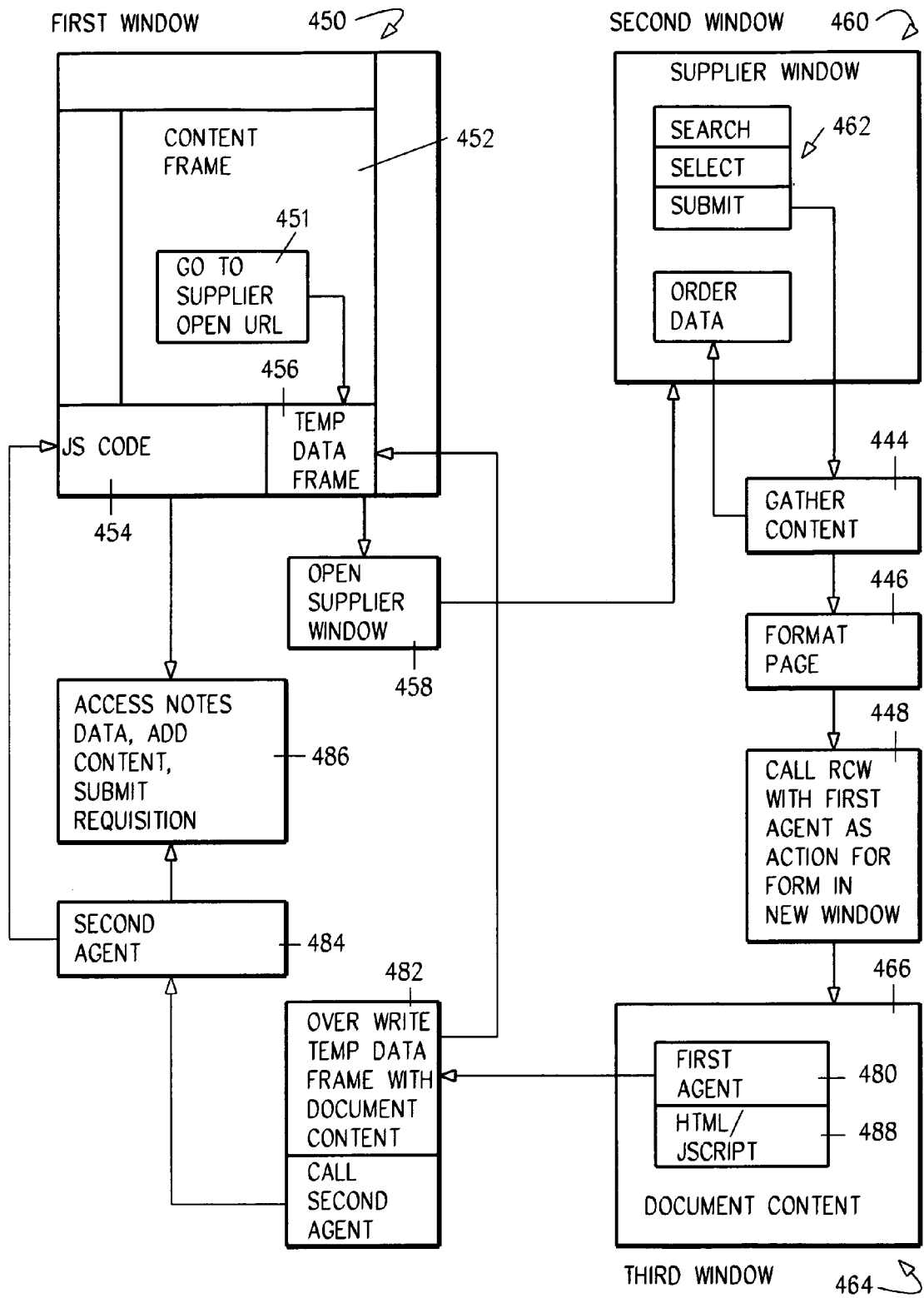
FIG. 21 is a diagram illustrating Notes agents for transferring data to an application browser session from a supplier window.

Referring to FIG. 21, a system and method are provided for data transfer from a externally owned site to an application owned frame set which operates as follows. The RCW application opens a supplier site URL in a temporary frame 456. Upon user selection of go to supplier 451, as is represented by step 458, frame 456 opens the supplier window 460 as a separate browser session. Two windows are now open: the original application 450 with its window underlying, and a supplier window 460 over it with the supplier URL. The reason for doing this is that the supplier requires that the browser be full frame, not in a small frame set. The primary RCW application in window 450 is quiesced to a wait state. As is represented by steps 462, the user can now select from window 460 items to buy, search, or whatever the supplier deems is appropriate for a user to order his data. The user then issues the command to submit the order. In step 444, the supplier site then gathers content from order data entered at window 460, in step 446 formats the page, and in step 448 issues a call to Req/Cat Web to open third window 464 with first agent 480. The supplier uses an enterprise specified agent name for first agent 480 when opening third window 464. Third window 464 is a window, but not a frame, and thus the Req/Cat Web can get access to it even though it is opened by the supplier. First agent 480 includes an html form command 488 which defines the processing to be done on the contents 466 of the form now displayed in third window 464, and the supplier site writes into this third window 464 unique order identifying information. Once written, the browser activates the form. Once activated, it is a program in its own right, the html 488 that was written and any java script in it will execute. One of first things it does is look at the action in the form command and determine that this is the program that will run to deal with the contents of this form. That action program, or first agent 480, is a RCW action program on the RCW server that can see contents of third window 464 because it is not in a frame, and thus ownership is not critical. In step 482, first RCW agent 480 executes a program or process that writes the contents 466 of window 464 back into its frame set (temporary frame) 456, and then calls second agent 484 which references Java script code 454 and, as is represented by step 486, access Notes data on the Notes server, add content to the requisition, and issue the commands that send the order to be stored in the requisition. This is key, Req/Cat Web has used its own process 480 to write into its own window 450, and knows who owns the data. First agent 480 process opened window 464 and writes the data to temporary frame 456 and then kicks off another process, second agent 484, that can read that data, can read and write to all of the frames 452 in the application, can access information from Lotus notes, and write all the information into the requisition.

Window 460 is provided by a supplier site from outside the application, and possibly also outside a firewall. Window 460 is an external application that allows execution of code 462 for performing search, select, submit (call enterprise server, which may be inside firewall), and order data, including gather content 444, formatting the page 446, and calling RCW 448 with the first agent 480 as an action form.

Window 464 is a window opened by the supplier to include a Req/Cat Web agent, first agent 480. First agent 480 posts document contents to temporary data frame 456. As a variation, for skills matching, calls are made to the agents 480, 484 with a parameter after placing the data to retrieve in a Notes database. The second agent 484 retrieves the data, can look up and add supporting data from yet another Notes database.

The key consideration here is, "who owns the frame". The server that owns the agent that last wrote a frame owns it, and can see its content, but cannot see any other frame's contents if they were written by another server's programs or agents.

Window 464 and first agent 480 act as an intermediary. Content 466 is owned by the supplier server 300, but the first agent 480 is owned by the Req/Cat Web server 114. That first agent 480 then kicks off the rest of the process, passing the data and ownership to the RCW server 114 and the second agent 484. The second agent 484 can now can access Notes data on the Notes server 112, and issue the commands that send the order to be stored in the requisition.

8. Customizable Side Bar

In accordance with the preferred embodiment of the invention, a customizable side bar is provided. Dynamic HTML is used by the navigator responsive to user input to change data presented at the screen without having to communicate with a remote server.

Referring to FIG. 4, navigation frame or menu bar appears, typically, on the left of a display window, to display a plurality of menu boxes, including headers 491–494 and items 495–500. As a cursor is moved over the headers, each individual header is highlighted or some symbol 481, 483, 485, 487, respectively, rotated by, say, 45 degrees, so as to point either down or to the right, to indicate to the user the header which will, upon being clicked, toggled to either a collapsed or expanded state from its current expanded or collapsed state, respectively. As illustrated, headers 481 and 483 are in a collapsed state, and headers 485 and 487 are in an expanded state. When expanded, header 485 is expanded to show items 495–498, and header 487 to show items 499–500. The user may move the cursor to one of items 495–500, and select the item to update the data displayed in content frame 480.

Heretofore, when the user selects (clicks on) a menu header 491, there is generally a pause as the request is made to the server to obtain a new page including an expanded menu bar 472 including a display of the included items. In accordance with a preferred embodiment of the invention, when server loads the window to a client, all of the information required to load the menu bar 472 is provided, including information for the expanded menu items (but not the content frame associated with them). If a menu header 485 is clicked when in the collapsed state, the menu items 496–498 are shown or made visible and the following menu headers and items are moved relative to the expanded menu bar. If a menu item 496 is clicked, then communication with the server is required to load the content frame 480.

Upon initial load, all headers 491–494 are collapsed and all menu items are hidden. Menu headers 491–494 are displayed below each other with no gaps between them. Clicking on a last menu header merely shows all the menu items and moves nothing below it. Clicking on the first menu header would show all of its items and move every header and item a constant amount without changing its visibility state. (The display area 472 may be off of the window, but is available via the scroll bar 490.) In accordance with this embodiment of the invention, the result of selecting a header 491–494 is an instantaneous response from the client browser either expanding or collapsing the selected header and respectively displaying or removing from display the included items.

This is done using dynamic html (dhtml), which allows creation of divisions within a document. These divisions are equivalent to tab items, menu items 495–500, or headers 491–494. In Netscape, these divisions are called layers. In Explorer, the layers are called divisions. These divisions can be hidden or shown, and moved relative distances on the screen. The current state of the art is to use these divisions for moving or flashing graphics, but not for business applications such as menu bars. In accordance with the present invention dhtml at the client creates subtle changes, business like, in the menu bar 472 without requiring server communications. The use of dhtml is described at developer.netscape.com.

Java script code, executable at a client for inserting, showing, moving and updating a menu bar 472, is illustrated in Table 6.

TABLE 6

MENU BAR CODE

```
1  ---- JavaScript (appNav.js) --------
2  // appNav Class Constructor
3  -----------------------------------------------------
4  // This class implements a JavaScript Object intended to represent the
5  Navigator function appNav(menuVar) {
6     //methods
7     this.init appNavInit;
8     this.sizeit = appNavSizeit;
9     this.toggletext = appNavToggleText;
10    this.isItem = appNavIsItem;
11    this.reverse = appNavReverse;
12    // properties
13    this.ns = document.layers;
14    this.ie = document.all;
15    this.loaded = 0;
16    this.whichone = 0;
17    this.whichgroup = 0;
18    if ( this.ns ) {
19       this.show = 'show';
20       this.hide = 'hide';
21    } else {
22       this.show = 'visible';
23       this.hide = 'hidden';
24    }
25    this.menus = menuVar;
26    this.max = menuVar.length;
27    this.images = new Array(this.max);
28    this.menuMove = new Array(this.max);
29    for (i=0;i < this.max; i++) this.menuMove[i] = 20 * (menuVar[i] −
30  1);
31    this.tabShow = [false, false, false, false, false, false, false,
32  false];
33  }
34  function appNavInit( ) {
35     var k=0;
36     if (this.loaded == 0) {
37        for (i=0; i < this.menuMove.length; i++) {
38           this.images[i] = new Array(this.menus[i]);
39           for (j=0; j < this.menus[i]; j++) {
40              this.images[i][j] = new Image( );
41              pos = ("0"+i).slice(i>9,2) + ("0"+j).slice(j>9);
42              this.images[i][j].src = "../images/men" +pos
43  +".gif"
44              if (this.ie) {
45
46  document.images[k].src=this.images[i][j].src;
47                 k++;
```

TABLE 6-continued

MENU BAR CODE

```
48         } else
49
50  document.layers["D"+pos].documnent.images[0].src=this.images
      [i][j].src;
51       }
52     }
53     this.loaded=1;
54   }
55 };
56 function appNavSizeit( ) {
57   if (this.loaded==1) {this.loaded = 0; this.init( );}
58 };
59 function appNavToggleText(z) {
60   if (this.loaded==1) {
61     this.tabShow[z] = !this.tabShow[z]
62     for (j=1; j<this.menus[z]; j++) {
63       pos = ("0"+z).slice(z>9) + ("0"+j).slice(j>9);
64       if (this.ie)
65         text = document.all("D"+pos).style
66       else
67         text = document.layers["D"+pos]
68       if (this.tabShow[z])
69         text.visibility = this.show;
70       else
71         text.visibility = this.hide;
72     }
73     for (i=z+1; i<this.max; i++) {
74       for (j=0; j<this.menus[i]; j++) {
75         pos = ("0"+i).slice(i>9) + ("0"+j).slice(j>9);
76         if (this.ie) {
77           text = document.all("D"+pos).style
78           if (this.tabShow[z])
79             text.pixelTop += this.menuMove[z]
80           else
81             text.pixelTop -= this.menuMove[z]
82         } else {
83           text = document.layers["D"+pos]
84           if (this.tabShow[z])
85             text.top += this.menuMove[z]
86           else
87             text.top -= this.menuMove[z]
88         }
89       }
90     }
91   }
92 };
```

ADVANTAGES OVER THE PRIOR ART

It is an advantage of the invention that there is provided a scalable database system in a web environment with optimal access performance characteristics for an expanding number of clients and a growing database.

It is an advantage of the invention that there is provided a system and method for enabling a requester to select the correct general ledger account when doing financial validation on a requisition.

It is an advantage of the invention that there is provided a system and method for utilizing Lotus script extensions in combination with a relational database to provide high capacity storage without performance degradation.

It is an advantage of the invention that there is provided a system and method for enabling a buyer a means for editing catalog content before externalizing it to production for access by requesters.

It is an advantage of the invention that there is provided a system and method for providing very flexible access to DB2 tables without requiring database administrator (DBA) involvement to issue grants against the tables, and bypassing the problem caused by Notes agents all coming from the same user (the Notes server ID).

It is an advantage of the invention that there is provided a system and method utilizing an existing infrastructure including Lotus Notes, Domino Go, and DB2 to combine HTML and Java script web presentation with DB2 data.

It is an advantage of the invention that there is provided a system and method for enabling transfer of data from a supplier site to a RCW application which does not entail frame spoofing.

It is an advantage of the invention that there is provided a system and method for dramatically increasing the speed of operation of a navigation frame of a GUI.

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A scalable system for providing a web processing tool, comprising:

a browser;

a first server cluster including a plurality of first servers, each said first server running identical first system and first application code for routing client requests among a plurality of enterprise applications;

a storage and execution unit, including a file server, a second server cluster, and an application server, for storing and executing an enterprise application comprising a plurality of web application code tables and data;

said file server including configuration file proxy statements for mapping user requests directed to said web application to said second server cluster;

said second server cluster including a plurality of second servers, each said second server running identical second system and identical selected components of said web application code, said second servers within said second server cluster periodically replicating with each other by moving identical data and code tables into identical data structures in each said second server so as to maintain data and code table consistency between them;

a relational database for storing data tables including a user profile specifying user roles;

said web application code tables including a first web application code table for authorizing access to other web application code tables based upon said user roles;

a database server for interfacing said relational database to said second server cluster and said application server;

a first network dispatcher for dynamically balancing client workload by redirecting client requests to one of said first servers based on current workload of first servers within said first server cluster;

a second network dispatcher responsive said first clustered servers for dynamically balancing client workload by redirecting clients to one of said second clustered servers based on current workload of servers within said plurality of second clustered servers;

said application server asynchronously responsive to said second servers for running agents to process application data requests and bridge said application data with respect to said database server and other back end servers.

2. The scalable system of claim 1, said first server being operable for presenting a graphical user interface to the said browser and for caching data on behalf of an end user.

3. The scalable system of claim 2, further comprising an external objects dynamic file for storing external objects in one place for dynamic access by said first servers, and for generating said gui.

4. The scalable system of claim 1, each said first server being a domino.go server operable for presenting a graphical user interface to said browser and redirecting said client via said second network dispatcher to a second server.

5. The scalable system of claim 4, further comprising a configuration file of proxy statements for mapping user requests to said second server cluster.

6. The scalable system of claim 1, said web processing tool being a web requisition catalog application.

7. The scalable system of claim 1, said second servers being operable for performing workflow, providing security, and serving as a document repository.

8. The scalable system of claim 7, said second servers being domino network servers.

9. The scalable system of claim 8, said document repository being requisitions stored in domino nsf files.

10. The scalable system of claim 1, said database server being a relational database server.

11. The scalable system of claim 1, said other back end server comprising an enterprise resource planning system, including an accounting application having an accounts payable function.

12. A method for generating on-line procurement requisitions, comprising the steps of:

receiving a client request;

dynamically balancing client workload among a plurality of first logically defined servers in a first server cluster by directing said request to one of said first servers based on current server workload, each said first server running identical first system and first application code for distributing said client request and a required function among a plurality of enterprise applications including a database access function;

distributing said database access function an application server and in a plurality of code tables and data tables on a plurality of second logically defined servers in a second server cluster;

storing data tables including a user profile specifying user roles in a relational database;

responsive to a client request for said database access function, dynamically balancing client workload among said plurality of second servers in said second server cluster based on current server workload;

operating one of said code tables to authorize access to other of said code tables based on said user profile;

periodically replicating said second servers with each other by moving identical data and code tables into identical data structures in each said second server so as to maintain data and code table consistency between them; and operating said second server to direct said client request to an application server where all data is replicated and where bridges and agents execute with respect to data in said database.

13. The method of claim 12, further comprising the steps of:

replicating application data to a back-end relational database server; and replicating application data to a back-end enterprise resource planning system including an accounting application having an accounts payable function.

14. A program storage device readable by a machine, tangibly embodying a program of instructions executable by a machine to perform method steps for processing a client request with respect to a database, said method steps comprising:

receiving a client request;

dynamically balancing server workload by directing said request to a first server within a first cluster of logically defined virtual servers based on current server usage, each server within said first cluster executing first code for determining the mapping of said client request and the function required among a plurality of enterprise applications including a database access function;

responsive to a client request for said database access function, dynamically balancing server workload by directing said client request to a second server within a second cluster of logically defined virtual servers based on current server usage, each server within said second cluster executing identical second application code including a plurality of web application workflow processes;

operating a first of said workflow processes for authorizing access to and execution of other of said workflow processes based on client user role;

periodically replicating said second servers within said second cluster of virtual servers by moving identical data and code tables into identical data structures in each said second server so as to maintain data and application code consistency between them; and operating said second server to direct said client request to an application server where all data is replicated and where bridges and agents execute with respect to data in said database.

15. The program storage device of claim 14, said method further comprising the step of operating said first servers for presenting a graphical user interface to the said browser and for caching data on behalf of an end user.

16. The program storage device of claim 14, said method further comprising:

synchronizing all virtual servers within said first server cluster; and synchronizing all virtual servers within said second server cluster.

17. The program storage device of claim 16, said method further comprising:

replicating application data to a back-end relational database server; and replicating application data to a back-end enterprise resource planning system including an accounting application having an accounts payable function.

18. The program storage device of claim 14, said method further comprising storing external objects in an external objects dynamic file for dynamic access by said first cluster of servers, and for generating said gui.

19. A computer program product for generating on-line procurement requisitions, said computer program product comprising:

a computer readable medium;

first program instructions for receiving a client request;

second program instructions for dynamically balancing server workload by directing said request to a first server within a first cluster of logically defined virtual servers based on current server usage, each server within said first cluster of servers executing identical first code;

third program instructions for operating said first server to determine the mapping of said client request and the function required;

fourth program instructions, responsive to a database access function, for dynamically balancing server workload by directing said client request to a second server within a second cluster of logically defined second virtual servers based on current server usage, each said second server within said second cluster of logically defined second virtual servers executing identical second code tables, said second servers within said second cluster of second virtual servers periodically replicating with each other by moving identical data and code tables into identical data structures in each said second server so as to maintain data consistency between them; and fifth program instructions for operating a code table in said second server to authorize said client request to access and execute selected other code tables based on client user role, and for operating said other code tables to direct said client request to an application server where all data is replicated and where bridges and agents execute with respect to data in said database; and wherein said first, second, third, fourth, and fifth program instructions are recorded on said medium.

* * * * *